US009201783B2

(12) United States Patent
Song

(10) Patent No.: US 9,201,783 B2
(45) Date of Patent: Dec. 1, 2015

(54) METHOD FOR MANAGING ADDRESS MAPPING INFORMATION AND STORAGE DEVICE APPLYING THE SAME

(75) Inventor: Jae Ik Song, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 132 days.

(21) Appl. No.: 13/539,695

(22) Filed: Jul. 2, 2012

(65) Prior Publication Data

US 2013/0173850 A1    Jul. 4, 2013

(30) Foreign Application Priority Data

Jul. 1, 2011    (KR) .................. 10-2011-0065481

(51) Int. Cl.
*G06F 12/02*    (2006.01)
*G06F 11/14*    (2006.01)

(52) U.S. Cl.
CPC ........ *G06F 12/0246* (2013.01); *G06F 11/1441* (2013.01); *G06F 11/1435* (2013.01)

(58) Field of Classification Search
CPC .......... G06F 12/0246; G06F 2212/222; G06F 11/1441; G06F 12/0871
See application file for complete search history.

(56) References Cited

U.S. PATENT DOCUMENTS

| 2004/0268116 | A1* | 12/2004 | Vasisht et al. ................. 713/100 |
| 2005/0071537 | A1* | 3/2005 | New et al. ..................... 711/100 |
| 2007/0204100 | A1* | 8/2007 | Shin et al. ..................... 711/103 |
| 2008/0320209 | A1* | 12/2008 | Lee et al. ...................... 711/103 |
| 2009/0172466 | A1* | 7/2009 | Royer et al. ..................... 714/6 |
| 2011/0099325 | A1* | 4/2011 | Roh et al. ...................... 711/103 |
| 2011/0131365 | A1* | 6/2011 | Zhang et al. .................. 711/103 |
| 2011/0161621 | A1* | 6/2011 | Sinclair et al. ................ 711/207 |
| 2011/0264948 | A1* | 10/2011 | Takada et al. ................ 714/6.11 |

OTHER PUBLICATIONS

Amer, Ahmed et al. (May 2010) "Design Issue for a Shingled Write Disk System" 26th IEEE Symposium on Massive Storage Systems and Technologies: Research Track.*

* cited by examiner

*Primary Examiner* — Kevin Verbrugge
*Assistant Examiner* — Francisco Grullon
(74) *Attorney, Agent, or Firm* — Hall Estill Attorneys at Law

(57) ABSTRACT

Methods and devices for managing address mapping information may include writing address mapping recovery information on a user data area of a storage medium in an initially set size unit, the address mapping recovery information being generated in response to a write operation, storing the address mapping recovery information without being written on the storage medium in a non-volatile memory device when an abnormal power off occurs in a storage device, and updating the address mapping information related to the storage device based on the address mapping recovery information stored in the non-volatile memory device and the storage medium when power is applied to the storage device.

20 Claims, 34 Drawing Sheets

| Byte offset | Member name |
|---|---|
| [3:0] | rPrevLPBA |
| [4:15] | rLog0 |
| [16:27] | rLog1 |
| ... | ... |
| ... | rLogN |

| LB NO | VB NO | LA VA |
|---|---|---|
| 0 | 2 | 199 |
|  | 0 | A |
| 1 |  |  |
| 2 | 3 | B |
| 3 | 7 | 199 |
|  | 1 | C |
| ⋮ | ⋮ | ⋮ |
| K-1 |  |  |
| K | K | 199 |
|  | Q | D |

| LBA NO | VA |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 86 |
| 11 | 87 |
| 12 | 88 |
| 13 | 89 |
| 14 | 90 |
| 15 | 91 |
| 16 | 92 |
| 17 | 93 |
| 18 | 94 |
| 20 | 15 |
| 21 | 16 |
| 50 | 38 |
| 51 | 39 |
| ⋮ | ⋮ |
| 59 | 47 |

FIG. 28A

| LB NO | VB NO | LA VA |
|---|---|---|
| 0 | 0 | 199 |
| 1 | | |
| 2 | | |
| 3 | 1 | 199 |
| | 3 | 101 |
| ⋮ | ⋮ | ⋮ |
| K-1 | | |
| K | 2 | 199 |
| | 4 | 145 |

FIG. 30

| NULL | |
|---|---|
| LBA | PBA |
| 3511 | 702 |
| 3512 | 703 |
| 3513 | 704 |
| 3514 | 705 |
| 3515 | 706 |
| 3541 | 707 |
| 3542 | 708 |
| 3543 | 709 |
| 2055 | 1210 |
| 2056 | 1211 |

I1

ADDRESS
MAPPING
RECOVERY
INFORMATION

FIG. 31A

| rPrevPBA1 ||
|---|---|
| LBA | PBA |
| 2081 | 1200 |
| 2061 | 1201 |
| 2062 | 1202 |
| 2100 | 1203 |
| 2101 | 1204 |
| 2200 | 1205 |
| 2051 | 1206 |
| 2052 | 1207 |
| 2053 | 1208 |
| 2054 | 1209 |

I2

ADDRESS MAPPING RECOVERY INFORMATION

FIG. 31B

| rPrevPBA0 ||
|---|---|
| LBA | PBA |
| 75 | 1000 |
| 101 | 1001 |
| 102 | 1002 |
| 181 | 1003 |
| 149 | 1004 |

I3

ADDRESS MAPPING RECOVERY INFORMATION

FIG. 31C

| LB NO | VB NO | LA VA |
|---|---|---|
| 0 | 0 | 199 |
|  | 5 | 4 |
| 1 |  |  |
| 2 | 6 | 11 |
| 3 | 1 | 199 |
|  | 3 | 109 |
| ⋮ | ⋮ | ⋮ |
| K-1 |  |  |
| K | 2 | 199 |
|  | 4 | 145 |

FIG. 32

| LBA | SCN | VA |
|---|---|---|
| 3001 | 9 | 93 |
| 3100 | 10 | 9 |
| 3120 | 2 | 10 |
| 3150 | 60 | 12 |
| 3410 | 20 | 73 |

METHOD FOR MANAGING ADDRESS MAPPING INFORMATION AND STORAGE DEVICE APPLYING THE SAME

CROSS-REFERENCE TO RELATED APPLICATION

Pursuant to 35 U.S.C. §119(a), this application claims the benefit of earlier filing date and right of priority to Korean Application No. 10-2011-0065481, filed on Jul. 1, 2011, the contents of which is incorporated by reference herein in its entirety.

BACKGROUND

This specification relates to a method and apparatus for accessing a storage medium, and particularly, to a method and apparatus for managing address mapping information.

A disk drive as one of storage media contributes to a computer system operation by writing data in a storage medium or read data from the storage medium based on a command issued from a host device. Researches on various writing methods are being conducted to improve writing density of the disk drive. Also, it is required to introduce a new method for managing address mapping information with respect to a storage medium, which is appropriate for a new writing method for improving writing density.

SUMMARY

Various embodiments of the present disclosure are generally directed to an apparatus and method for managing address mapping information when an abnormal (sudden) power off event occurs in a storage device.

In some embodiments, a method of managing address mapping information includes writing a first set of address mapping recovery information to a storage medium in response to a first succession of write operations to the storage medium. A second set of address mapping recovery information is subsequently written to a non-volatile memory device in response to a second succession of write operations to the storage medium and in response to an abnormal power down occurrence. The second set of address mapping recovery information identifies an address of the first set of address memory recovery information on the storage medium. Upon resumption of power, the address mapping information is updated using the first and second sets of address mapping recovery information.

In other embodiments, a data storage device has a non-volatile data storage medium, a volatile solid-state memory device, a non-volatile solid-state memory device and a processor. The processor is configured to manage address mapping information associated with user data stored on the storage medium by generating and storing a first version of the address mapping information to the storage medium or the non-volatile memory device which represents a state of the storage medium at a first time. The processor further operates to accumulate a first set of address mapping recovery information in the volatile memory responsive to a plural number n successive data write operations to the storage medium after the first time and to store the first set of address mapping recovery information to the storage medium at a selected address at a second time. The processor further accumulates a second set of address mapping recovery information in the volatile memory responsive to a plural number m less than n successive data write operations to the storage medium after the second time stores the second set of address mapping recovery information in the non-volatile memory device responsive to an abnormal power off occurrence associated with the storage device at a third time. Finally, the processor generates an updated, second version of the address mapping information using the first and second sets of address mapping recovery information responsive to a reapplication of power to the storage medium at a fourth time, wherein the second set of address mapping recovery information comprises the selected address and is used to access the first set of address mapping recovery information from the storage medium.

In further embodiments, a method includes generating and storing a first version of address mapping information to describe a state of a storage medium; accumulating a first set of address mapping recovery information in a volatile memory that describes a plural number n subsequent data write operations to the storage medium; storing the first set of address mapping recovery information to a selected address of the storage medium; accumulating a second set of address mapping recovery information in the volatile memory responsive to a plural number m less than n subsequent data write operations to the storage medium; detecting an abnormal power off occurrence associated with the storage device; storing the second set of address mapping recovery information in the non-volatile memory device responsive to the abnormal power off occurrence, the second set of address mapping recovery information comprising the selected address at which the first set of address mapping recovery information is stored; detecting a subsequent reapplication of power to the storage device; and generating an updated, second version of the address mapping information using the first and second sets of address mapping recovery information.

BRIEF DESCRIPTION OF THE DRAWINGS

FIG. 26 is a view illustrating one example of address mapping information indicating an allocated state of virtual bands with respect to a logical band illustrated in FIG. 10;

FIG. 28A illustrates one example of address mapping information related to the virtual band number 0 illustrated in FIG. 27;

FIG. 30 is a view illustrating address mapping information with respect to the configuration of the logical bands and the virtual bands illustrated in FIG. 92A;

FIGS. 31A to 31C are views illustrating one example of address mapping recovery information generated in a method for managing address mapping information in accordance with one exemplary embodiment;

FIG. 32 is a view illustrating address mapping information with respect to the configuration of the logical bands and the virtual bands illustrated in FIG. 92B;

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, description will be given of the preferred embodiments with reference to the accompanying drawings.

Figure 1:
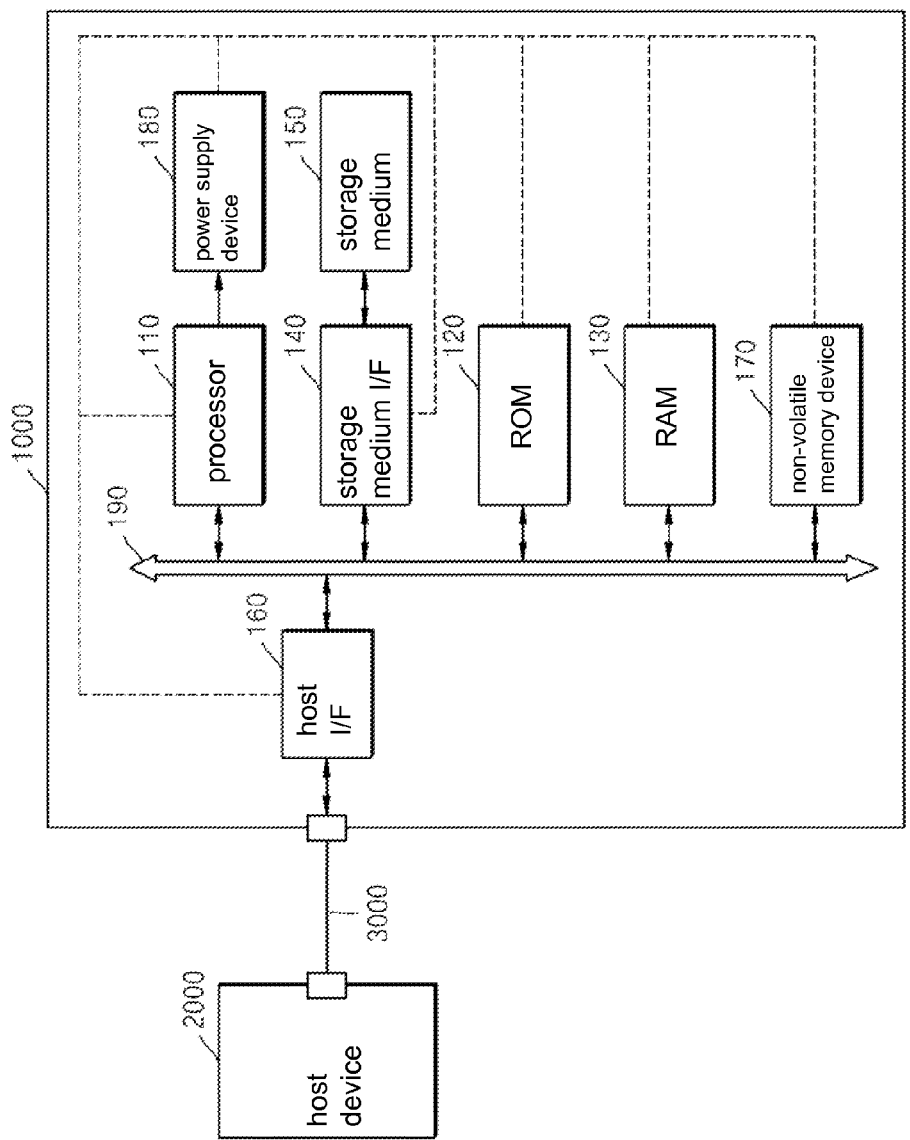
FIG. 1 is a block diagram of a computer system in accordance with one exemplary embodiment.

As illustrated in FIG. 1, a computer system in accordance with one exemplary embodiment may include a storage device 1000, a host device 2000, and a connector 3000.

In detail, the storage device 1000 may include a processor 110, a Read-Only Memory (ROM) 120, a Read Access Memory (RAM) 130, a storage medium interface (I/F) 140, a storage medium 150, a host interface 160, a non-volatile memory device 170, a power supply device 180, and a bus 190.

The host device 2000 may issue a command for operating the storage device 1000, and transmit the command to the storage device 1000 connected thereto via the connector 3000 so as to perform a process of transmitting or receiving data to or from the storage device 1000 according to the issued command.

The connector 3000 is a unit for electrically connecting an interface port of the host device 2000 to an interface port of the storage device 1000, and may include a data connector and a power source connector. As one example, for using a Serial Advanced Technology Attachment (SATA) interface, the connector 3000 may include a 7-pin SATA data connector and a 15-pin SATA power source connector.

Hereinafter, each component of the storage device 1000 will be described.

The power supply device 180 is a device for supplying a power source voltage required for the storage device 1000, and serve to supply preliminary power to the storage device 1000 when power is abnormally cut off. A power source line (power line) is indicated with a dotted line in FIG. 1. An operation of the power supply device 180 will be explained with reference to FIG. 11.

Figure 11:
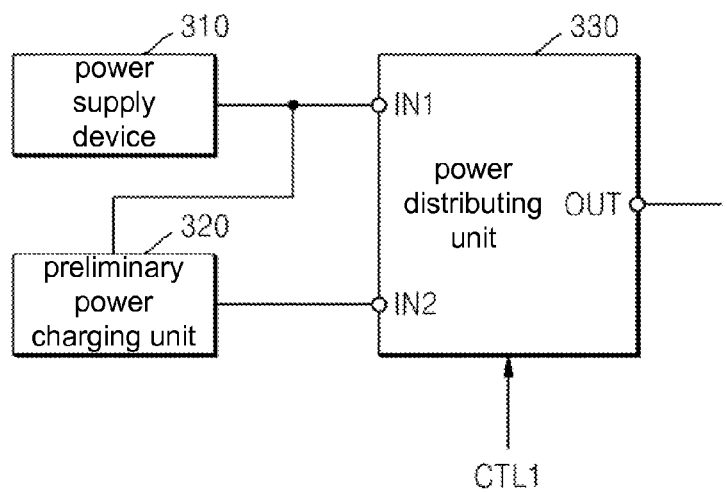
FIG. 11 is a block diagram of a power supply device illustrated in FIGS. 1 and 4.

As illustrated in FIG. 11, the power supply device 180 may include a power supply unit 310, a preliminary power charging unit 320 and a power distributing unit 330.

The power supply unit 310 may supply power required for the storage device 1000 in a normal power-on state. The preliminary power charging unit 320 may supply preliminary power required to perform a process of storing address mapping recovery information, which is necessary to recover address mapping information in the storage device 1000, in the non-volatile memory device 170 in a state that power supplied from the power supply unit 310 is abnormally (suddenly) blocked.

A detailed operation of the preliminary power charging unit 320 will be described later with reference to FIGS. 12 and 13.

The power distributing unit 330 may select power generated in the power supply unit 310 or power generated in the preliminary power charging unit 310 according to the control of the processor 110 and distribute such selected power to required circuits of the storage device 1000. Especially, in the abnormal power-off state, the power distributing unit 330 may supply power charged in the preliminary power charging unit 320 to circuits constructing the storage device 1000 based on a second control signal CTL2 applied from the processor 110.

For reference, the processor 110 may generate a first control signal CTL1 having a logical value for connecting a first input terminal IN1 to an output terminal OUT of the power distributing unit 330 when the storage device 1000 is initialized. In addition, the processor 110 may generate the first control signal CTL1 having the logical value for connecting the first input terminal IN1 to the output terminal OUT of the power distributing unit 330 while power is normally supplied.

The processor 110 may generate the first control signal CTL1 having the logical value for connecting a second input terminal IN2 to the output terminal OUT of the power distributing unit 330 when power is off abnormally.

The processor 110 may determine that the abnormal power off has occurred when a voltage of power supplied to the storage device is lowered below a threshold voltage without generation of a power off control signal. That is, the processor 110 may determine that the abnormal power off has occurred when the voltage of power output from the power supply device 180 is lowered below the threshold voltage in a power-on mode.

According to the first control signal CTL1 generated in the processor 110, power generated in the power supply unit 310 may be supplied to the storage device 1000 while power is normally supplied, and power generated in the preliminary power charging unit 310 may be supplied to the storage device 1000 when power is abnormally off.

Hereinafter, an operation of a preliminary power charging unit 320' will be described in accordance with one exemplary embodiment with reference to FIG. 12.

Figure 12:
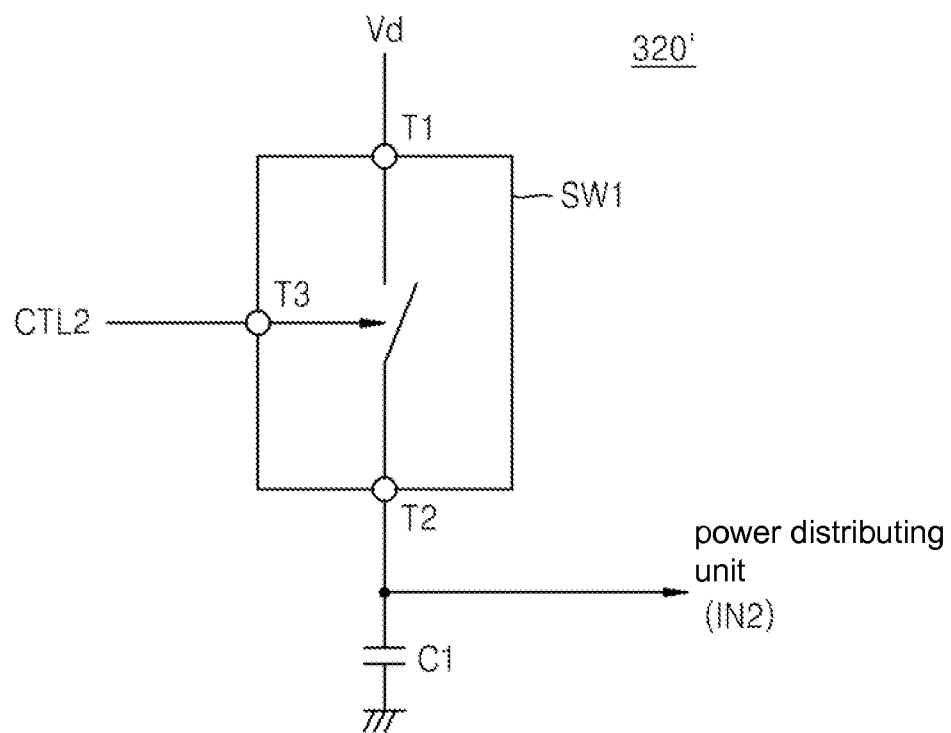
FIG. 12 is a detailed view illustrating a circuit configuration of a preliminary power charging unit illustrated in FIG. 11 in accordance with one exemplary embodiment.

As illustrated in FIG. 12, a preliminary power charging unit 320' in accordance with one exemplary embodiment may include a first switching element SW1 and a capacitor C1.

The first switching element SW1 may have a first terminal T1 to which a power source voltage Vd generated in the power supply unit 310 is applied, and a second terminal T2 connected to a first terminal of the capacitor C1. The capacitor C1 may have a second terminal connected to a ground. A second control signal CTL2 for controlling a switching operation of the first switching element SW1 may be applied to a control terminal T3 of the first switching element SW1. The second control signal CTL2 may be generated in the processor 110 as follows.

The processor 110 may generate a second control signal CTL2 having a logical value for connecting the first terminal T1 and the second terminal T2 of the first switching element SW1 in a power-on state. the processor 110 may generate the second control signal CTL2 having a logical value for separating the first terminal T1 and the second terminal T2 of the first switching element SW1 from each other when an abnormal power off occurs.

According to the generated second control signal CTL2, a power source voltage Vd may be charged in the capacitor C1 in the power-on state, and the voltage charged in the capacitor C1 may be applied to the second input terminal IN2 of the power distributing unit 330 in an abnormal power off state. That is, when power is abnormally cut off, the voltage charged in the capacitor C1 may be supplied to the storage device as preliminary power.

Referring back to FIG. 1, the processor 110 may serve to interpret commands and control elements (components) of the data storage device according to the interpretation result. The processor 110 may generate various types of control signals for control of the power supply device 180. The processor 110 may include a code object management unit. The processor 110 may load code objects, which are stored in the storage medium 150, into the RAM 130 using the code object management unit. The processor 110 may load, into the RAM 130, code objects for executing a method for managing address mapping information according to flowcharts illustrated in FIGS. 19 to 25 and a method for managing address mapping information via a network according to a flowchart illustrated in FIG. 42.

Figure 42:
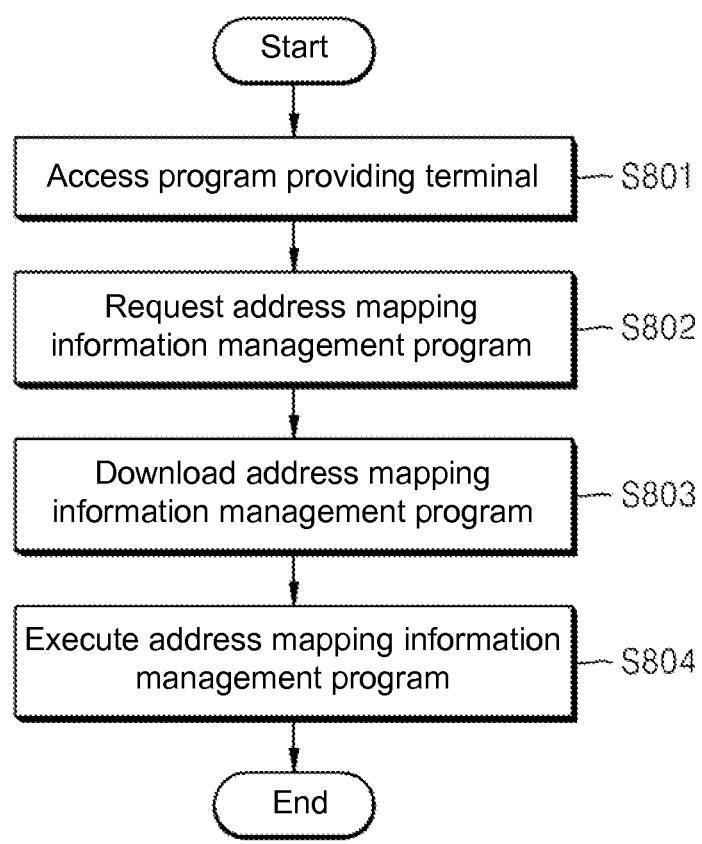
FIG. 42 is a flowchart illustrating a method for managing address mapping information through a network in accordance with one exemplary embodiment.

The processor 110 may use the code objects loaded to the RAM 130 to execute tasks for the method for managing address mapping information according to the flowcharts illustrated in FIGS. 19 to 25 and the method for managing address mapping information via a network according to the flowchart illustrated in FIG. 42. The method for managing address mapping information and the method for managing address mapping information via the network, which are executed by the processor 110, will be explained in detail with reference to FIGS. 19 to 25 and FIG. 42.

The ROM 120 may store program codes and data which are necessary to drive the data storage device.

The program codes and the data stored in the ROM 120 or the storage medium 150 may be loaded into the RAM 130 according to the control by the processor 110. In the present disclosure, when the storage device is initialized, the processor 110 may load address mapping information, which is stored in the storage medium 150, into the RAM 130. If it is designed to store the address mapping information in the non-volatile memory device 170, the processor 110 may load the address mapping information stored in the non-volatile memory device 170 into the RAM 130 when the storage device is initialized. In addition, address mapping recovery information in response to a data write operation may be stored in the RAM 130.

The address mapping recovery information may include information related to positions of data, which have been written without being reflected in the address mapping information stored in the storage medium 150 or the non-volatile memory device 170. An example of the address mapping recovery information is illustrated in FIG. 17.

Figures 16, 17:
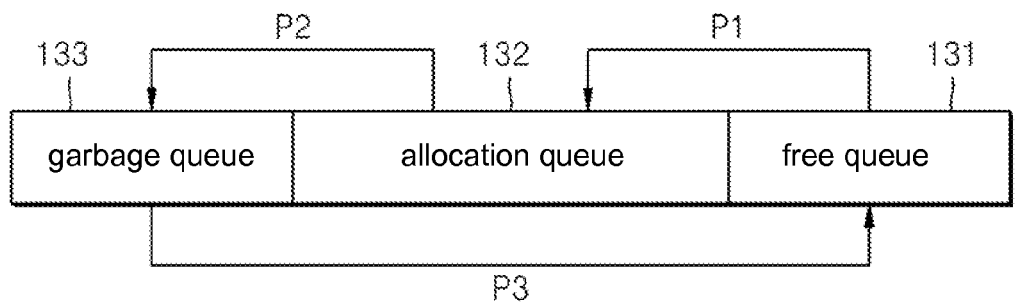
FIG. 16 is a detailed view illustrating a configuration of a second processor illustrated in FIG. 15.
FIG. 17 is a view illustrating a configuration of address mapping recovery information in accordance with one exemplary embodiment.

Referring to FIG. 17, in a rPrevPBA member may be stored a physical address of the storage medium 150 on which a previous address mapping recovery information has been written. In respective rLog0 to rLogN members may be stored physical block addresses (PBAs) associated with positions of data, which have been written without being reflected in the address mapping information stored in the storage medium 150 or the non-volatile memory device 170, and logical block addresses (LBAs) mapped onto the PBAs. The PBA may be referred to as a physical address.

Also, when both data and a corresponding logical block address are written in the storage medium 150 upon execution of a write operation in the storage device, the address mapping recovery information may include physical addresses for positions of data, which have been written in the storage medium 150 without being reflected in the address mapping information, and a physical address of the storage medium 150 on which the previous address mapping recovery information has been written. Here, the physical addresses for the positions of the data, which have been written in the storage medium 150 without being reflected in the address mapping information, may be stored in rLog0 to rLogN members, respectively.

A size allocated in the RAM 130 for the address mapping recovery information may be restricted. That is, the maximum number of rLog members to be stored in the RAM 130 may be limited. The size allocated in the RAM 130 for the address mapping recovery information may be set to be smaller than a storage capacity to be writable in the non-volatile memory device 170 upon occurrence of the abnormal power off in the storage device.

When the address mapping recovery information is fully stored in the size allocated in the RAM 130, the processor 110 may control the address mapping recovery information stored in the RAM 130 to be written on a user data area of the storage medium 150 and the PBA of the storage medium 150 where the address mapping recovery information has been written to be stored in rPrevPBA of the address mapping recovery information configured as illustrated in FIG. 17. In addition, the processor 110 may control the rLog0 to rLogN members for the address mapping recovery information, which is configured as illustrated in FIG. 17 and stored in the RAM 130, to be deleted.

The RAM 130 may be implemented as a DRAM or SRAM as a volatile memory device. Also, the RAM 130 may be designed to be driven in a Single Data Rate (SDR) manner or a Double Data Rate (DDR) manner.

The storage medium 150 may include a disk or non-volatile semiconductor memory device as a main storage medium of the storage device. The storage device may include a disk drive, for example. A detailed construction of a head disk assembly 100 having a disk and a head in a disk drive is illustrated in FIG. 3.

Figure 3:
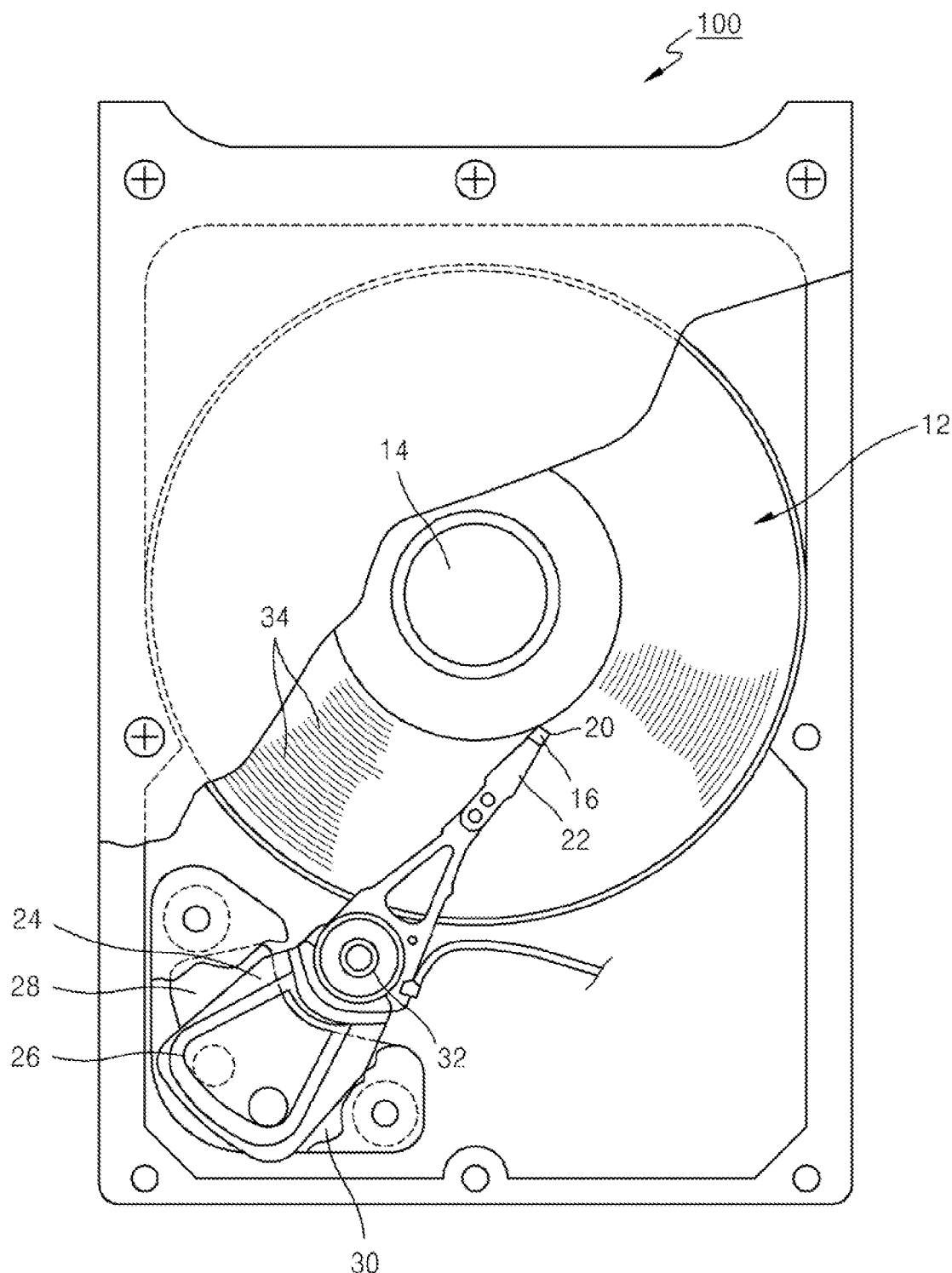
FIG. 3 is a planar view illustrating a head disk assembly of a disk drive in accordance with one exemplary embodiment.

Referring to FIG. 3, the head disk assembly 100 may include at least one disk 12 that is rotated by a spindle motor 14. The disk drive may further include a head 16 located adjacent to a surface of the disk 12.

The head 16 may sense a magnetic field of each disk 12 and magnetize the disk 12 to read or write information from or in the disk 12 as it rotates. Typically, the head 16 may be coupled to a surface of each disk 12. Although one head 16 is illustrated in FIG. 3, it should be understood that the head 16 includes a writing head for magnetizing the disk 12 and a separate reading head for sensing the magnetic field of the disk 12. The reading head may include a Magneto-Resistive (MR) device. The head 16 may also be referred to as a magnetic head or a transducer.

The head 16 may be integrated with a slider 20. The slider 20 may generate an air bearing between surfaces of the head 16 and the disk 12. The slider 20 may be coupled to a head gimbal assembly 22. The head gimbal assembly 22 may be attached onto an actuator arm 24 having a voice coil 26. The voice coil 26 may be located near a magnetic assembly 28 to define a Voice Coil Assembly (VCM). A current supplied to the voice coil 26 may generate torque for rotating the actuator arm 24 with respect to a bearing assembly 32. The rotation of the actuator arm 24 may move the head 16 across the surface of the disk 12.

Information may be stored in annular tracks of the disk 12. Each of the tracks 34 may include a plurality of sectors. A sector architecture for one track is illustrated in FIG. 5.

Figure 5:
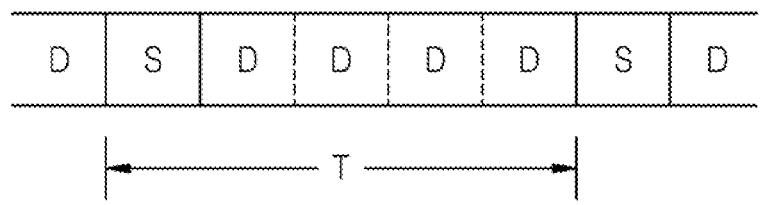
FIG. 5 is a view illustrating a sector architecture for one track of a disk as a storage medium applied to the present disclosure.

As illustrated in FIG. 5, one servo sector section T may include a servo information area S and a data area. The data area may include a plurality of data sectors D. Alternatively, one servo sector section may include a single data sector D. The data sector D may be divided into an area for storing data and a spare area. an LBA corresponding to data written on the data sector D may be written on the spare area of the data sector D. Of course, the LBA may not be written on the spare area of the data sector D.

Figure 6:
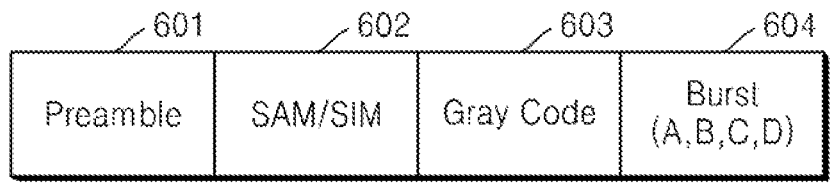
FIG. 6 is a view illustrating a structure of a servo information area illustrating in FIG. 5.

In the servo information area S may be recorded, in detail, signals as illustrated in FIG. 6.

Referring to FIG. 6, in the servo information area S may be written a preamble 601, a servo synchronization indication signal 602, a gray code 603 and a burst signal 604.

The preamble 601 may provide clock synchronization during reading of servo information. Also, the preamble 601 may provide a specific timing margin by forming a gap before a servo sector. The preamble 601 may also be used to determine a gain (not illustrated) of an Automatic Gain Control (AGC) circuit.

The servo synchronization indication signal 602 may include a Servo Address Mark (SAM) and a Servo Index Mark (SIM). The SAM is a signal indicating a start of a servo sector, and the SIM is a signal indicating a start of a first servo sector on a track.

The gray code 603 may provide track information. The burst signal 604 is used to control the head 16 to follow a middle part of the tracks 34. As one example, the burst signal 603 may include four patterns of A, B, C and D. That is, a position error signal for tracking control may be generated from a combination of the four burst patterns A, B, C and D.

The disk 12 may be divided into a maintenance cylinder area that is accessible by a user, and a user data area that is not accessible by the user. The maintenance cylinder area may also be referred as a system area. Various types of information which are necessary to control a disk drive may be stored in the maintenance cylinder area. Of course, information required to perform the method for managing address mapping information according to this specification may also be stored in the maintenance cylinder area. Especially, address mapping information for converting an LBA into a physical address of a disk based on a virtual address may be stored in the maintenance cylinder area.

Here, the address mapping information may include information for converting an LBA received from a host device into a physical address of the storage medium based on a virtual band corresponding to a physical area of the storage medium having the disk. The address mapping information may also be included in metadata.

In detail, the address mapping information may include mapping information between a logical band classified as a set of LBAs and a virtual band corresponding to a physical area of the storage medium, and mapping information between LBAs and virtual addresses on a virtual band, which is allocated to a logical band. The virtual address may be information indicating a physical position of the storage medium.

Also, the address mapping information may include mapping table information indicating a relationship between an LBA and the physical address of the storage medium. The address mapping information may include mapping table information, which indicates an allocation relation between a logical band classified as a set of LBAs and a virtual band corresponding to the physical area of the storage medium, and an allocation relation between LBAs and virtual addresses on a logical band.

The head 16 may be moved across the surface of the disk 12 to read information from or write information to other tracks. A plurality of code objects for enabling the disk drive to implement various functions may be stored in the disk 12. As one example, a code object for executing an MP3 player function, a code object for executing a navigation function, a code object for executing various video games and the like may be stored in the disk 12.

Referring back to FIG. 1A, the storage media interface 140 is a component to allow the processor 110 to access the storage medium 150 so as to read or write information. The storage medium interface 140 in the storage device which takes the form of a disk drive may include in detail a servo circuit for control of the head disk assembly 100, and a read/write channel circuit for processing a signal to read or write data.

The host interface 160 is a component for executing data transmission/reception to/from the host device 2000, such as a personal computer, a mobile terminal and the like. For example, the host interface 160 may employ various types of interfaces, such as Serial Advanced Technology Attachment (SATA) interface, Parallel Advanced Technology Attachment (PATA) interface, Universal Serial Bus (USB) interface and the like.

The non-volatile memory device 170 may be implemented as a non-volatile semiconductor memory device, for example, a flash memory, a Phase Change RAM (PRAM), a Ferroelectric RAM (FRAM), a Magnetic RAM (MRAM) and the like.

The non-volatile memory device 170 may store address mapping recovery information. In detail, when power is abnormally off, the processor 110 may read the address mapping recovery information which has been stored in the RAM 130 to store in the non-volatile memory device 170.

The bus 190 may serve to transfer information among those elements of the storage device.

Hereinafter, description will be given of a software operation system of a disk drive as one example of a storage device, with reference to FIG. 2.

Figure 2:
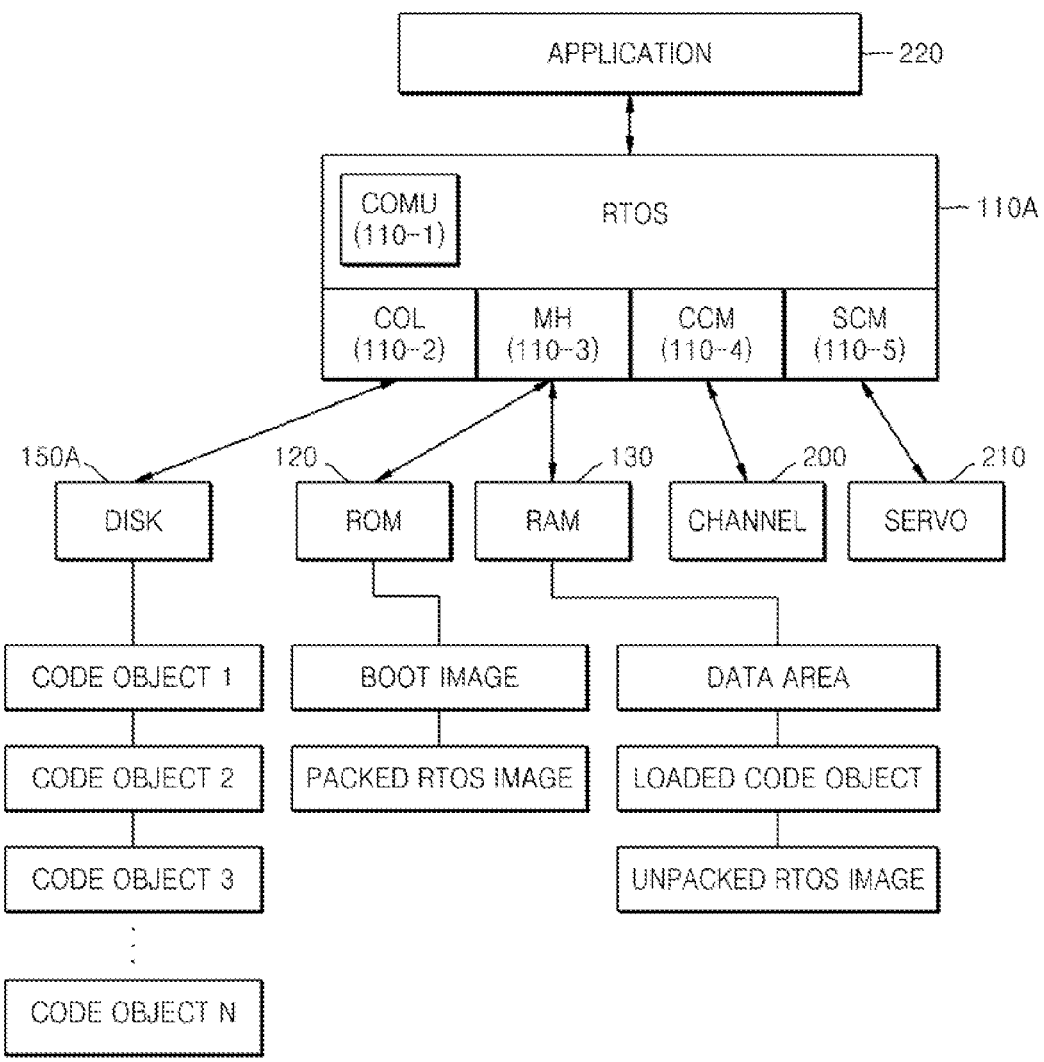
FIG. 2 is a view illustrating a software operation system of a storage device illustrated in FIG. 1.

As illustrated in FIG. 2, a disk 150A as a storage medium of a Hard Disk Drive (HDD) may store a plurality of code objects 1 to N.

The ROM 120 may store a boot image and a packed Real-Time Operating System (RTOS) image.

The disk 150A may store the plurality of objects 1 to N. The code objects stored in the disk 150A may include not only code objects for operating the disk drive but also code objects for performing various extendable functions of the disk drive. Especially, the disk 150A may store code objects for executing the methods according to flowcharts illustrated in FIGS. 19 to 25 and FIG. 42. The code objects for executing the methods according to the flowcharts illustrated in FIGS. 19 to 25 and FIG. 42 may alternatively be stored in the ROM 120, instead of the disk 150A. In addition, the disk 150A may also store code objects for executing various functions, such as a MP3 player function, a navigation function, a video game function and the like.

An unpacked RTOS image obtained by reading a boot image from the ROM 120 during booting may be loaded to the RAM 130. In addition, code objects, which are stored in the disk 150A and necessary to execute the host interface, may be loaded to the RAM 130. Especially, the address mapping information may be loaded to the RAM 130. Address mapping recovery information generated in response to a data write operation may be stored in the RAM 130.

Circuits required for processing signals to read or write data may be installed in a channel circuit 200. Also, circuits for controlling the head disk assembly 100 to read or write data may be installed in a servo circuit 210.

A Real Time Operating System (RTOS) 110A is a multi-program operating system using a disk. Depending on tasks, a real-time multiprocessing may be performed on a higher priority foreground task, and a batch processing may be performed on a lower priority background task. In addition, the RTOS 110A may load code objects from the disk and unload code objects to the disk.

The RTOS 110A may manage a Code Object Management Unit (COMU) 110-1, a Code Object Loader (COL) 110-2, a Memory Handler (MH) 110-3, a Channel Control Module (CCM) 110-4 and a Servo Control Module (SCM) 110-5 to execute tasks according to requested commands. The RTOS 110A may also manage application programs 220.

In detail, the RTOS 110A may load code objects, which are necessary to control a disk drive, to the RAM 130 when the disk drive is booted. Therefore, after booting, the disk drive may be operated using the code objects loaded to the RAM 130.

The COMU 110-1 may store position information where the code objects are written, and perform a bus arbitration process. The COMU 110-1 may also store information related to priorities of tasks being executed, and manage Task Control Block (TCB) information and stack information, required for executing tasks regarding the code objects.

The COL 110-2 may load the code objects stored in the disk 150A to the RAM 130 using the COMU 110-1, or unload the code objects stored in the RAM 130 to the disk 150A. Accordingly, the COL 110-2 may load the code objects, which are stored in the disk 150A and required for executing the methods according to the flowcharts of FIGS. 19 to 25 and FIG. 42, to the RAM 130.

The RTOS 110A may execute the methods according to the flowcharts illustrated in FIGS. 19 to 25 and FIG. 42, which will be explained later, using the code objects loaded to the RAM 130.

The MH 110-3 may write data to or read data from the ROM 120 and the RAM 130.

The CCM 110-4 may perform channel controlling required for processing a signal to write or read data, and the SCM 110-5 may control a servo system including the head disk assembly 100 for reading/writing data.

Figure 4:
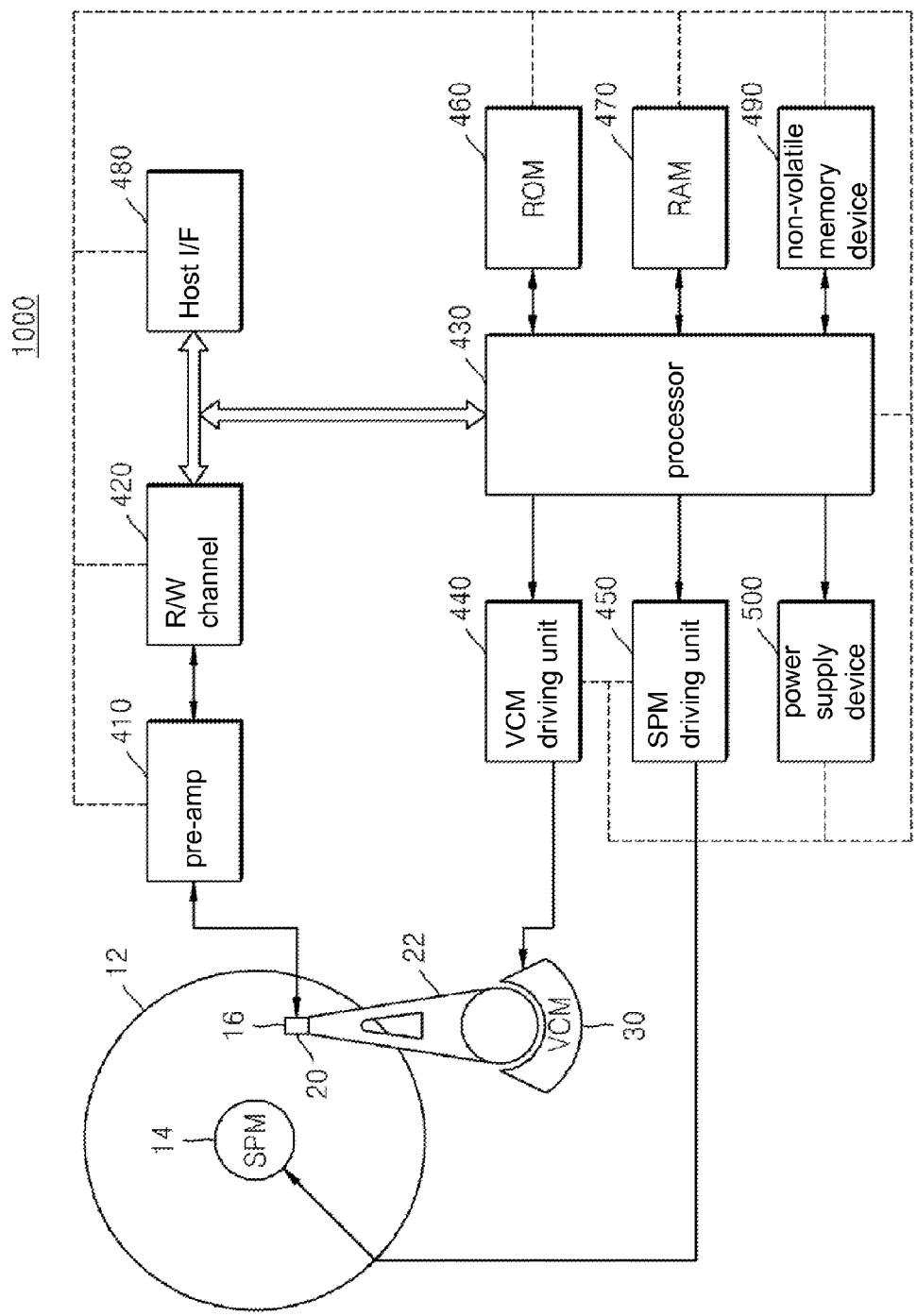
FIG. 4 is a view illustrating an electrical configuration of a disk drive in accordance with one exemplary embodiment.

An electrical circuit configuration of disk drive 1000 as one example of the storage device according to the one exemplary embodiment illustrated in FIG. 1 is illustrated in FIG. 4.

As illustrated in FIG. 4, a disk drive 1000 according to one exemplary embodiment may include a pre-amplifier 410, a read/write (R/W) channel 420, a processor 430, a Voice Coil Motor (VCM) driving unit 440, a Spindle Motor (SPM) driving motor 450, a ROM 460, a RAM 470, a host interface 480, a non-volatile memory device 490, and a power supply device 500.

The processor 430 may be a Digital Signal Processor (DSP), a microprocessor, a microcontroller or the like. The processor 430 may control the R/W channel 420 to read information from or to write information to the disk 12 according to a command received from the host device 2000 via the host interface 480.

The processor 430 may be coupled to the VCM driving unit 440 which supplies a driving current to drive a VCM 30. The processor 430 may supply a control signal to the VCM driving unit 440 to control movement of the head 16.

The processor 430 may also be coupled to the SPM driving unit 450 which supplies a driving current to drive the SPM 14. When power is supplied, the processor 430 may supply a control signal to the SPM driving motor 450 to rotate the SPM 14 at a target speed.

The processor 430 may be coupled to the power supply device 500 to generate control signals for control of the power supply device 500.

The processor 430 may be coupled to the ROM 460 and the RAM 470, respectively. The ROM 460 may store firmware and control data for control of the disk drive. The ROM 460 may also store program codes and information for executing the methods according to the flowcharts illustrated in FIGS. 19 to 25 and FIG. 42. Alternatively, the program codes and information for executing the methods according to the flowcharts illustrated in FIGS. 19 to 25 and FIG. 42 may be stored in a maintenance cylinder area of the disk 12, instead of the ROM 460.

Under the control of the processor 430, the program codes stored in the ROM 460 or the disk 12 may be loaded to the RAM 470 in an initialization mode, and data received via the host interface 480 or data read out of the disk 12 may be temporarily stored in the RAM 470. Especially, the address mapping information may be loaded to the RAM 470 in the initialization mode. That is, the address mapping information may be stored in the RAM 470 in the initialization mode. Also, the address mapping recovery information may be stored in the RAM 470 in response to a data write operation. As one example, the address mapping recovery information configured as illustrated in FIG. 17 may be stored. The configuration of the address mapping recovery information may be differently designed.

A size allocated in the RAM 470 for the address mapping recovery information may be limited. When the address mapping recovery information is fully stored in the size allocated in the RAM 470, the processor 430 may control the address mapping recovery information stored in the RAM 470 to be written on the user data area of the disk 12, and the PBA of the disk 12 where the address mapping recovery information has been written to be stored in rPrevPBA, which is allocated in the RAM 470 for the address mapping recovery information configured as illustrated in FIG. 17. Also, the processor 430 may control the rLog0 to rLogN members of the address mapping recovery information, which is configured as illustrated in FIG. 17 and stored in the RAM 470, to be deleted.

The RAM 470 may be implemented as a DRAM or SRAM. Also, the RAM 470 may be designed to be driven in a Single Data Rate (SDR) manner or a Double Data Rate (DDR) manner.

The processor 430 may control the disk drive to execute the methods according to the flowcharts illustrated in FIGS. 19 to 25 and FIG. 42 using the program codes and information stored in the ROM 460 or the maintenance cylinder area of the disk 12.

The non-volatile memory device 490 may be implemented as a flash memory, a Phase Change RAM (PRAM), a Ferroelectric RAM (FRAM), a Magnetic RAM (MRAM) or the like.

The non-volatile memory device 490 may store the address mapping recovery information. In detail, when power is abnormally off, the address mapping recovery information stored in the RAM 470 may be read out and stored in the non-volatile memory device 490 under the control of the processor 430.

The power supply device 500 is a device for supplying a power source voltage required for the disk drive, and serve to supply preliminary power to the disk drive when power is abnormally off. A power source line (power line) is indicated with a dotted line in FIG. 1. a detailed configuration of the power supply device 500 is illustrated in FIG. 11. Description of FIG. 11 has been previously given, so duplicate description thereof will be avoided.

Figure 13:
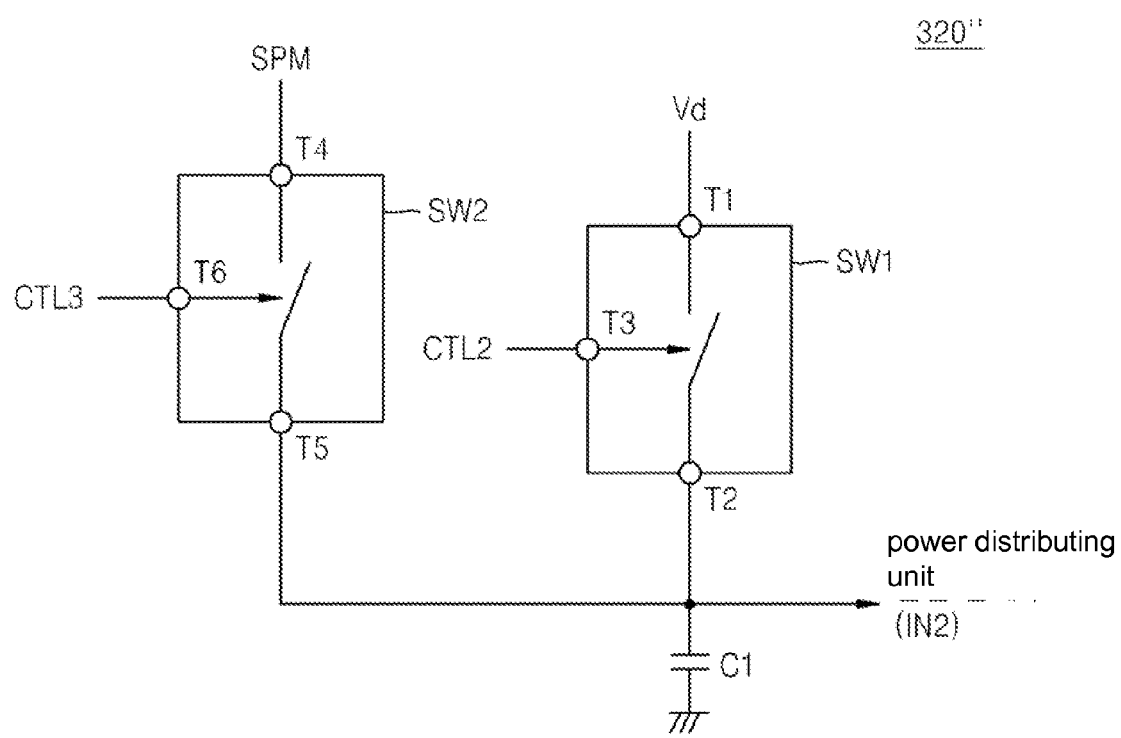
FIG. 13 is a detailed view illustrating a circuit configuration of the preliminary power charging unit illustrated in FIG. 11 in accordance with another exemplary embodiment.

The preliminary power charging unit 320 illustrated in FIG. 11 may be designed as illustrated in FIG. 12 and also designed as illustrated in FIG. 13. A detailed configuration of the preliminary power charging unit illustrated in FIG. 12 has been already described. Therefore, repetitive description will be avoided.

Hereinafter, another exemplary embodiment of a preliminary power charging unit illustrated in FIG. 13 will be described.

As illustrated in FIG. 13, a preliminary power charging unit 320" according to another exemplary embodiment may include a first switching element SW1, a second switching element SW2 and a capacitor C1.

A power source voltage Vd generated in the power supply unit 310 may be applied to a first terminal T1 of the first switching element SW1. A first terminal of the capacitor C1 may be connected to a second terminal T2 of the first switching unit SW1, and a second terminal of the capacitor C1 may be connected to a ground. A second control signal CTL2 for controlling a switching operation of the first switching element SW1 may be applied to a control terminal T3 of the first switching element SW1. A terminal, to which a back electromotive force (BEMF) generated in a spindle motor SPM is applied, may be connected to a first terminal T4 of the second switching element SW2, and the first terminal of the capacitor C1 may be connected to a second terminal T5 of the second switching element SW2. A third control signal CTL3 for controlling a switching operation of the second switching element SW2 may be applied to a control terminal T6 of the second switching element SW2. The second control signal CTL2 and the third control signal CTL3 may be generated in the processor 430 as follows.

In a power-on state, the processor 430 may generate a second control signal CTL2 having a logical value for connecting the first terminal T1 and the second terminal T2 of the first switching element SW1 to each other. In an abnormal power-off state, the processor 430 may generate a second control signal CTL2 having a logical value for connecting the first terminal T1 and the second terminal T2 of the first switching element SW1 to each other.

Based on the second control signal CTL2, a power source voltage Vd may be charged in the capacitor C1 in the power-on state, and the voltage charged in the capacitor C1 may be applied to the second input terminal IN2 of the power distributing unit 330 in the abnormal power-off state. That is, when power is abnormally off, the voltage charged in the capacitor C1 may be supplied to the disk drive as preliminary power.

The processor 430 may also generate a third control signal CTL3 having a logical value for connecting the first terminal T4 and the second terminal T5 of the second switching element SW2 to each other when power is abnormally off, so as to apply to the control terminal T6 of the second switching element SW2. Accordingly, the capacitor C1 may be charged by the BEMF generated in the spindle motor 14, which is rotating by inertia after power is off.

Description will be given of a data read operation and a data write operation which are executed after searching for a physical address of a disk corresponding to a logical block address designated by a read command or a write command, with reference to FIG. 4.

In a data read mode of the disk drive, the pre-amplifier 410 amplifies an electrical signal sensed from the disk 12 by the head 16. The R/W channel 420 then amplifies a signal output from the pre-amplifier 410 by using an automatic gain control circuit (not shown) that automatically varies a gain according to an amplitude of the signal, converts the electrical signal into a digital signal, and then decodes the digital signal to detect data. For instance, an error correction process may be performed on the detected data by the processor 430 using a Reed-Solomon code, which is an error correction code, and then the detected data can be converted into stream data so as to be transmitted to the host device 2000 via the host interface 480.

In a data write mode, the disk drive receives data and LBA from the host device via the host interface 480, and the processor 430 adds an error correction symbol to the data using the Reed-Solomon code. The R/W channel 420 then encodes the data to be suitable for a write channel. Then, the data is written onto the disk 12 by the head 16 to which a write current amplified by the pre-amplifier 410 is applied.

Hereinafter, description will be given of an operation that the processor 430 executes the methods according to the flowcharts illustrated in FIGS. 19 to 25 and FIG. 42 using the program codes and information loaded to the RAM 470.

First of all, description will be given of a shingled-write scheme which is a newly proposed writing method to increase recording density in a disk drive as one of the storage device according to the present disclosure.

Figure 7:
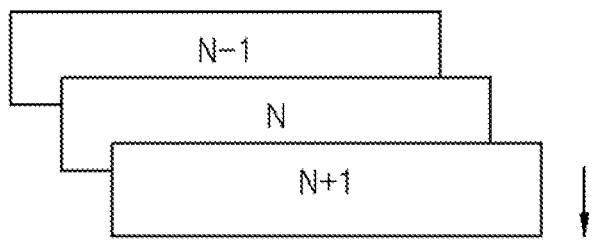
FIG. 7 is a schematic view illustrating a track shape in response to a flux generation in a shingled-writing scheme in accordance with one exemplary embodiment.

The shingled-write is a scheme of executing a write operation in one direction since tracks of a disk are overlapped each other in the form of tiles. That is, as illustrated in FIG. 7, if it is assumed that writing is performed in an arrow-indicated direction in the shingled-write scheme, when writing is performed on N track adjacent to N−1 track, the N−1 track is partially overwritten. Also, when writing is performed on N+1 track adjacent to the N track, the N track is partially overwritten. This may result in enhancement of Track Per Inch (TPI) characteristic as a recording density in a radial direction of a storage medium.

Figure 8:
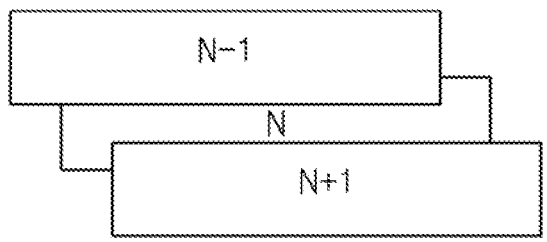
FIG. 8 is a schematic view illustrating a track shape in response to an adjacent track interference in a shingled-writing scheme in accordance with one exemplary embodiment.

This shingled-write scheme always generates flux only in one direction. Therefore, a constraint that N−1 track cannot be written after the N track is written should be met. As illustrated in FIG. 8, after writing on the N track, if N−1 track is written in a reverse direction of the shingled-write being progressing, the N track is erased due to Adjacent Track Interference (ATI).

Therefore, to solve the problem, required is a technology of dynamically allocating a new disk address with respect to a Logical Block Address (LBA) provided by a host so as to always perform writing only in one of an inner circumferential direction or an outer circumferential direction of a disk.

The present disclosure proposes a method for utilizing an existing LBA as it is using a virtual address during conversion of the existing LBA into Cylinder Head Sector (CHS) as a physical address of a disk drive, and accessing a disk to satisfy a constraint that a shingled-write progresses only in one direction in the disk drive.

Figure 9:
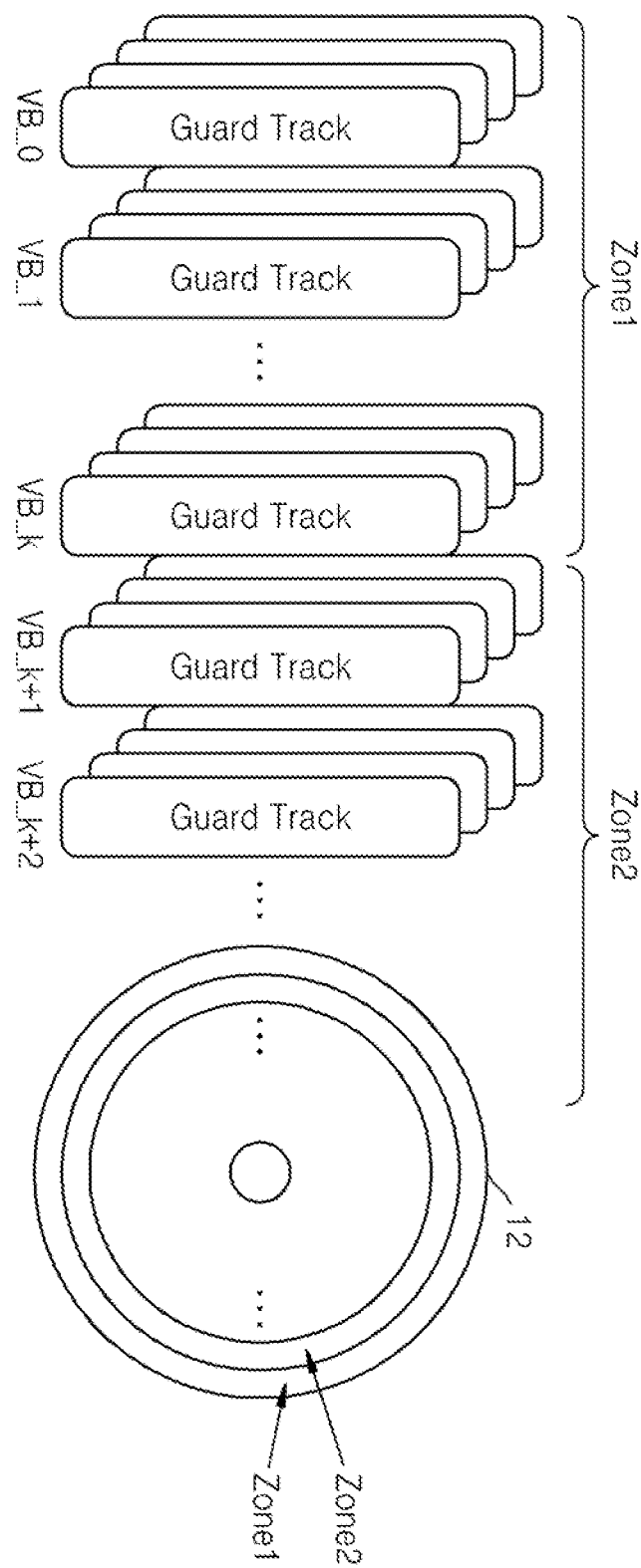
FIG. 9 is a view illustrating a structure of physical zones and virtual bands for a storage medium in accordance with one exemplary embodiment.

Hereinafter, a configuration of a zone and a virtual band for implementing an access method proposed in the present disclosure will be described with reference to FIG. 9.

A storage area of the disk 12 may be divided into a plurality of physical zones. Each of the physical zones may have a differently set Tracks Per Inch (TPI) or Bits Per Inch (BPI) value as recording density. Each of the physical zones may include a plurality of virtual bands (VBs), and each virtual band may be defined as a set of M consecutive tracks, which are overwritten. A guard track may be present between the virtual bands to prevent overwriting therebetween. As illustrated in FIG. 9, a physical zone 1 may be allocated with K+1 virtual bands VB_0~VB_K. That is, this indicates that a physical storage space of a storage medium is divided into the virtual bands of a unit size. Tracks belonging to the virtual band may generate address mapping information such that data can be written sequentially in one of an inner circumferential direction or an outer circumferential direction of the disk.

Next, an allocation structure of a logical band and a virtual band per each zone will be described with reference to FIG. 10.

Figure 10:
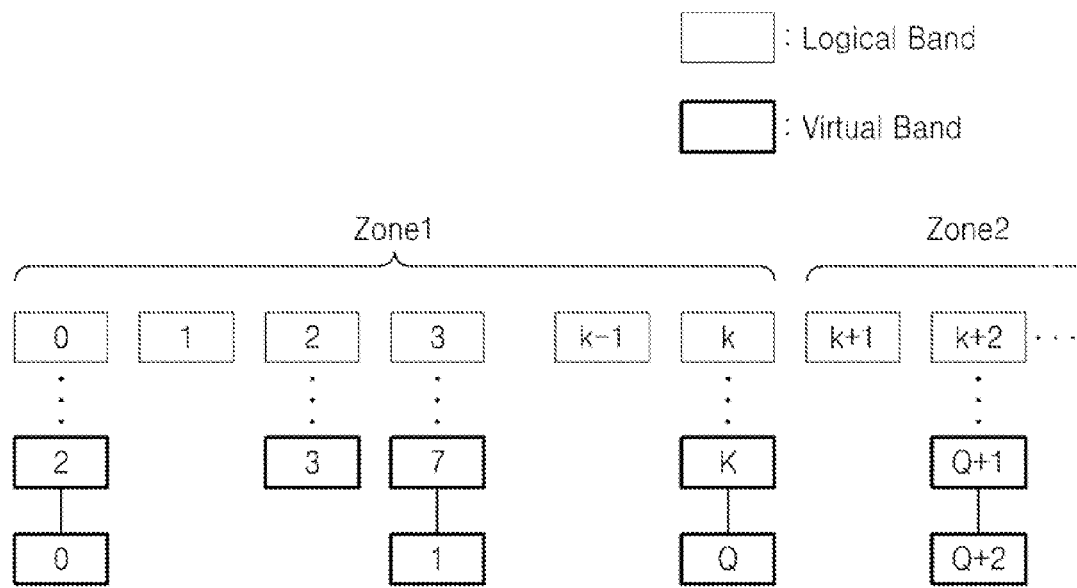
FIG. 10 is a schematic view illustrating a structure of virtual bends allocated to a logical band for each physical zone of a storage medium in accordance with one exemplary embodiment.

FIG. 10 is a schematic view illustrating an allocation structure of a Virtual Band (VB) with respect to a Logical Band (LB) for each physical zone of a storage medium in accordance with one exemplary embodiment.

As illustrated in FIG. 10, in order to actually execute a write operation on a physical zone of a storage medium, a virtual band is allocated to a logical band. A physical zone 1 of the storage medium may include K+1 logical bands. Here, the logical band is defined as a set of consecutive Logical Block Addresses (LBAs) of a first size unit. That is, the logical band indicates a set of consecutive writable LBAs.

For example, if it is assumed that the physical zone 1 includes 10000 LBAs in the range of 0 to 9999, and a logical band belonging to the physical zone 1 is defined as a set of 1000 LBAs, 10 logical bands may belong to the physical zone 1.

Here, the number (Q) of virtual bands may be set to be larger than the number (K) of logical bands (i.e., Q>K). Here, the virtual bands may be set by dividing the physical storage space of the storage medium by a second size unit. That is, when the storage medium is a disk, the virtual band, as illustrated in FIG. 9, can be defined at a set of M over-writable tracks.

Virtual bands without being allocated to the logical band, among the virtual bands, may be referred to reserved virtual bands. Expressing this differently, a storage area corresponding to virtual bands without being allocated to the logical band may be referred to as a reserved area. Reserved virtual band information may be stored in a free queue, which will be explained later with reference to FIG. 16.

Hereinafter, description will be given of an operation of managing address mapping information in a storage device, which includes a storage medium performing an access using a virtual band.

Figure 14:
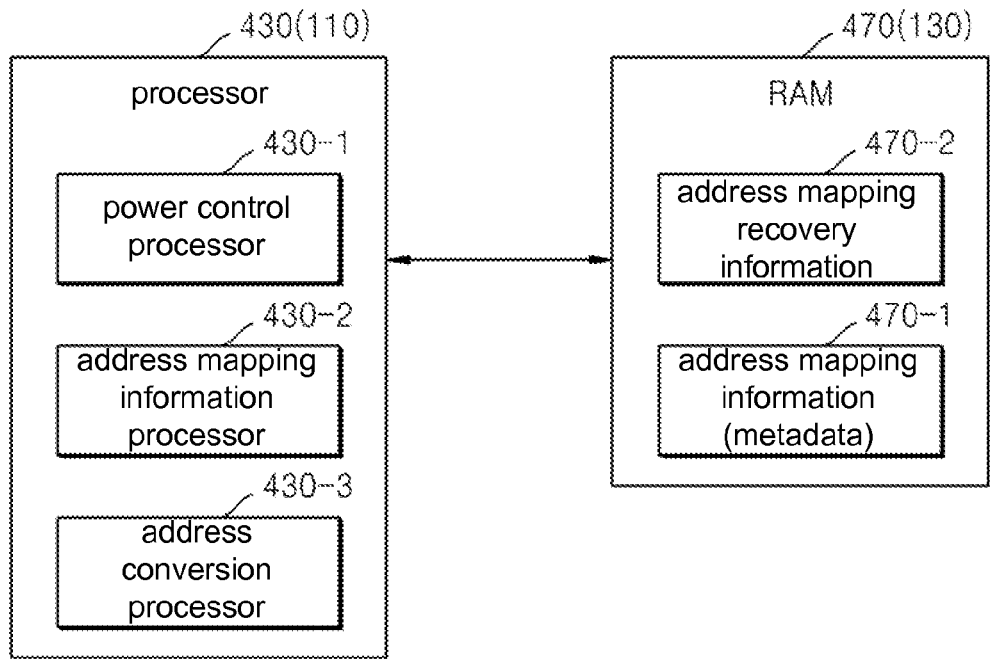
FIG. 14 a detailed view illustrating a configuration of a processor and a RAM of a storage device in accordance with one exemplary embodiment.

FIG. 14 illustrates detailed structures of the processor 110 and the RAM 130 of the storage device illustrated in FIG. 1 or the processor 430 and the RAM 470 of the disk drive illustrated in FIG. 4 in accordance with the one exemplary embodiment of the present disclosure. For the sake of explanation, the structures illustrated in FIG. 14 will be described with reference to the disk drive of FIG. 4.

As illustrated in FIG. 14, the processor 430 may include a power control processor 430-1, an address mapping information management processor 430-2, and an address conversion processor 430-3.

The address mapping information management processor 430-2 may control address mapping information 470-1 to be loaded to the RAM 470. Here, the address mapping information 470-1 may include information for converting a logical block address into a physical address of the storage medium using a virtual address. As one example, the address mapping information may be mapping table information indicating an allocation relation between a logical band and a virtual band and an allocation relation between a logical block address and a virtual address on a virtual band allocated to the logical band. The address mapping information may be included in metadata.

The address mapping information 470-1 may be read out of the non-volatile memory device 490 or the disk 12 to be stored in the RAM 470. The address mapping information 470-1 may allow for searching a virtual address based on LBA. The virtual address may be defined based on the physical address of the storage medium. When the storage medium is a disk, the virtual address may be defined as a physical address of a sector. Also, the virtual address in the disk may be defined based on a Cylinder Head Sector (CHS). In addition, the virtual address in the disk may be defined based on a physical zone, a virtual band, a track and a sector. The address mapping information 470-1 may be generated such that data can be written sequentially in one of an inner or outer circumferential direction of the track of the disk included in the virtual band according to the shingled-write scheme.

The address mapping information 470-1 may include information indicating the allocation structure of the virtual bands with respect to the logical band for each physical zone. That is, the address mapping information 470-1, as illustrated in FIG. 10, may include information indicating a mapping structure of the virtual bands allocated to the logical band for each physical zone.

Address mapping information, which indicates an allocated state of the virtual bands allocated to the logical band illustrated in FIG. 10, may be generated as illustrated in FIG. 26.

As illustrated in FIG. 26, the address mapping information may include items of a logical band number LB NO, a virtual band number VB NO, and a virtual address number LA VA which is last accessed on a virtual band.

Referring to FIG. 26, it can be noticed that virtual band numbers (VB NOs) 2 and 0 are allocated to a logical band number (LA NO) 0, the last accessed virtual address (LA VA) on the virtual band number 2 is 199, and the last accessed virtual address on the virtual band number 0 is A.

One example shows that if each virtual band is divided into 200 sectors and virtual addresses for each virtual band are set in the range of 0 to 199, there is not a virtual address left to be newly allocated on the virtual band number 2 since the virtual addresses up to the last virtual address 199 have already been allocated. In addition, when a write command for LBA belonging to the logical band number 0 is received, address mapping information may be updated so that the virtual address (A+1) of the virtual band 0 can be mapped to LBA designated by the write command.

A, B, C and D in FIG. 26 indicate virtual addresses each having an integer value in the range of 1 to 199.

Figure 27:
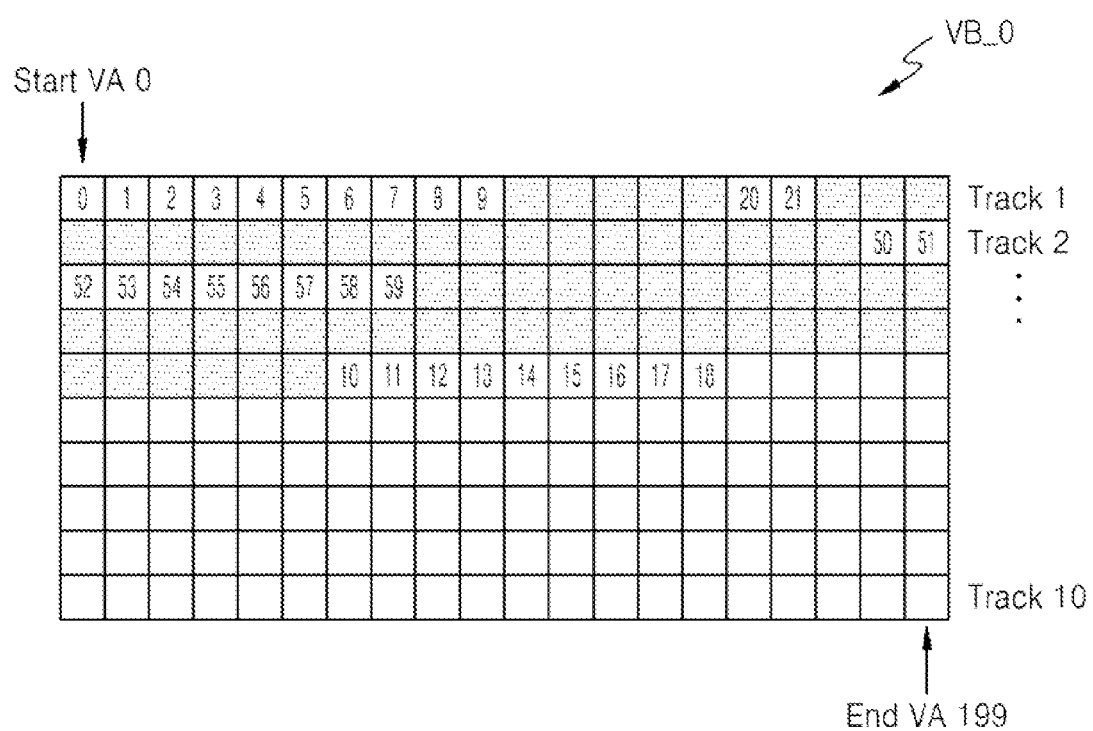
FIG. 27 is an overview illustrating one example of a mapping architecture of Virtual Addresses (VAs) with respect to LBAs on a virtual band number 0.

An example of mapping a virtual address (VA) to an LBA on a virtual band 0 (VB_0) allocated to the logical band 0 is illustrated in FIG. 27.

Referring to FIG. 27, the virtual band 0 (VB_0) includes virtual addresses from 0 to 199, and each virtual address is allocated in a sector unit. Hence, in FIG. 27, a unit virtual band includes 200 sectors. A horizontal line shows sectors included on one track. As illustrated in FIG. 26, one track includes 20 sectors. 20 sectors belonging to a track 1 are defined as virtual addresses (VAs) from 0 to 19. According to the same method, 20 sectors belonging to a track 10 are defined as VAs from 180 to 199.

Referring to FIG. 27, LBAs 0 to 9 are allocated to VAs 0 to 9, LBAs 20 and 21 are allocated to VAs 15 and 16, LBAs 50 to 59 are allocated to VAs 38 to 47, and LBAs 10 to 18 are allocated to VAs 86 to 94. VAs 10 to 14, 17 to 37 and 48 to 85 indicate invalid virtual addresses, and VAs 95 to 199 indicate valid virtual addresses without being allocated. The invalid virtual address indicates a previous virtual address which corresponded to an updated LBA.

As one example, the address mapping information for the virtual band 0 (VB_0) illustrated in FIG. 27 may be generated as illustrated in FIG. 28A.

FIG. 28A is a mapping table simply illustrating a mapping relation between VAs and corresponding individual LBAs allocated to VB_0. The mapping table with the structure illustrated in FIG. 28A may have a disadvantage in view of a large quantity of data due to simply arranging the VAs corresponding to the respective LBAs.

To overcome such disadvantage, a method for generating address mapping information by setting LBAs and VAs which are sequentially increasing with each other into one group may be proposed.

That is, in the newly proposed address mapping information, a group in which the LBAs and VAs are sequentially increasing is represented by a start LBA, a start VA and the number of sequentially increasing sectors (SCN).

Referring to FIG. 27, LBAs 0 to 9 are sequentially increasing in VAs 0 to 9, LBAs 20 to 21 are sequentially increasing in VAs 15 to 16, LBAs 50 to 59 are sequentially increasing in VAs 38 to 47, and LBAs 10 to 18 are sequentially increasing in VAs 86 to 94.

Figure 28B:
FIG. 28B illustrates another example of address mapping information related to the virtual band number 0 illustrated in FIG. 27.

Mapping information related to the four groups, in which the LBAs and VAs are sequentially increasing together, as aforementioned, may be represented in a table as illustrated in FIG. 28B.

Since the start LBA is 0, the start VA is 0 and the number of sequentially increasing sectors is 10 with respect to the group in which the LBAs 0 to 9 are sequentially increasing in the VAs 0 to 9, (LBA, SCN, VA) may be represented by (0, 10, 0).

Similarly, since the start LBA is 20, the start VA is 15, and the number of sequentially increasing sectors is 2 with respect to the group in which the LBAs 20 to 21 are sequentially increasing in the VAs 15 to 16, a meta key (LBA, SCN, VA) may be represented by (20, 2, 15). In addition, for the group in which the LBAs 50 to 59 are sequentially increasing in the VA 38 to 47, a meta key (LBA, SCN, VA) may be represented by (50, 10, 38), and for the group in which the LBAs 10 to 18 are sequentially increasing in the VAs 86 to 94, a meta key (LBA, SCN, VA) may be represented by (10, 9, 86).

Accordingly, address mapping information may be generated as illustrated in FIG. 28B. It can be noticed that the address mapping information illustrated in FIG. 28B is simplified more than the address mapping information illustrated in FIG. 28A, and the quantity of data is reduced.

Consequently, with respect to virtual bands allocated to the logical band, the address mapping information for each virtual band allocated to the logical band may be generated according to the method illustrated in FIG. 28B.

Therefore, to the RAM 470 may be loaded mapping information indicating the allocation relation between the logical band and the virtual bands and the last accessed virtual address on the virtual band as illustrated in FIG. 26, and mapping information indicating VA corresponding to LBA on a virtual band allocated to the logical band as illustrated in FIG. 28A or 28B.

Referring back to FIG. 14, the power control processor 430-1 may generate control signals required to control the power supply device of FIGS. 11 to 13.

While power is normally supplied, the power control processor 430-1 may generate a first control signal CTL1 having a logical value for connecting a first input terminal IN1 and an outer terminal OUT of the power distributing unit 330 to each other. When power is abnormally off, the power control processor 430-1 may generate a first control signal CTL1 having a logical value for connecting the second input terminal IN2 and the output terminal OUT of the power distributing unit 330 to each other.

The power control processor 430-1 may determine that power is abnormally off when a voltage of power applied to the storage device is lowered below a threshold voltage without generating a power off control signal. That is, the power control processor 430-1 may determine that an abnormal power off has occurred when the voltage of power output from the power supply device 500 is lowered below the threshold voltage in a power-on mode.

According to the first control signal CTL1 generated in the power control processor 430-1, power generated in the power supply unit 310 may be supplied to circuits constructing the disk drive while power is normally supplied, and power generated in the preliminary power charging unit 320 may be supplied to the circuits constructing the disk drive when the abnormal power off has occurred.

In the power-on state, the power control processor 430-1 may generate a second control signal CTL2 having a logical value for connecting the first terminal T1 and the second terminal T2 of the first switching element SW1 illustrated in FIGS. 12 and 13 to each other. In the abnormal power-off state, the power control processor 430-1 may generate a second control signal CTL2 having a logical value for separating the first terminal T1 and the second terminal T2 of the first switching element SW1 from each other.

According to the generated second control signal CTL2, a power source voltage Vd may be charged in the capacitor C1 in the power-on state, and the voltage charged in the capacitor C1 may be applied to the second input terminal IN2 of the power distributing unit 330 in the abnormal power-off state. That is, when the abnormal power off has occurred, the voltage charged in the capacitor C1 may be supplied to the circuits constructing the disk drive as preliminary power.

When the abnormal power off has occurred, the power control processor 430-1 may generate a third control signal CTL3, which has a logical value for connecting the first terminal T4 and the second terminal T5 of the second switching element SW2 illustrated in FIG. 13 to each other, and apply the third control signal CTL3 to the control terminal T6 of the second switching element SW2. Accordingly, the capacitor C1 may be charged by the BEMF generated in the spindle motor 14, which is rotating by inertia after power is off.

The address mapping information management processor 430-2 may perform a process of managing address mapping information. In detail, when power is supplied to the disk drive, the address mapping information management processor 430-2 may load the address mapping information, which is stored in the disk 12 or the non-volatile memory device 490, to the RAM 470. That is, the address mapping information management processor 430-2 may read the address mapping information out of the disk 12 or the non-volatile memory device 490 so as to store in the RAM 470.

The address mapping information management processor 430-2 may change the address mapping information 470-1 stored in the RAM 470 based on a write command. That is, the address mapping information management processor 430-2 may add virtual band information, which has been newly allocated to a logical band, or virtual address information, which has been added in correspondence with the LBA on the allocated virtual band, to the address mapping information 470-1 stored in the RAM 470 based on the write command. Consequently, the address mapping information 470-1 stored in the RAM 470 may be updated every time of executing the write command.

The address mapping information management processor 430-2 may generate address mapping recovery information 470-2 by executing the write command, and store the generated address mapping recovery information 470-2 in the RAM 470. The address mapping recovery information 470-2 may include information related to positions of data, which have been written without being reflected in the address mapping information stored in the disk 12 or the non-volatile memory device 490. As one example, the address mapping recovery information 470-2a as illustrated in FIG. 17 may be generated.

Referring to FIG. 17, in rPrevPBA may be stored a physical address of the storage medium 150 in which the previous address mapping recovery information has been written. In respective rLog0 to rLogN members may be stored physical block addresses (PBAs) associated with positions of data, which have been written on the disk 12 without being reflected in the address mapping information stored in the disk 12 or the non-volatile memory device 490. Here, a NULL value as an initial value may be stored in rPrevPBA of the address mapping recovery information 470-2.

Also, when both data and a logical block address corresponding to the data are written on the disk 12 during a write operation of the drive, address mapping recovery information may include physical addresses for positions of data which have been written on the disk 12 without being reflected in address mapping information and a physical address for the disk 12 on which the previous address mapping recovery information has been written. In this case, the physical addresses for the positions of the data written on the disk 12 without being reflected in the address mapping information may be stored in rLog0 to rLogN members illustrated in FIG. 17, respectively.

The present disclosure may limit a size allocated in the RAM 470 for the address mapping recovery information. That is, the maximum number of rLog members to be stored in the RAM 130 may be limited. The size allocated in the RAM 130 for the address mapping recovery information may be set to be smaller than a storage capacity to be writable in the non-volatile memory device 490 upon an occurrence of abnormal power off in the storage device. For the sake of explanation, the maximum number of rLog members to be stored in the RAM 470 has been set to 10, for example. However, the present disclosure may not be limited to this.

In the present disclosure, every time when the address mapping information 470-1 stored in the RAM 470 based on the write command is updated, the updated address mapping information 470-1 may not be stored in the disk 12 or the non-volatile memory device 490. Upon performing the process of storing the updated address mapping information in the disk 12 or the non-volatile memory device 490 every time when the address mapping information 470-1 is updated, a write/read operation may not be executed while the address mapping information is stored. This may cause performance of the disk drive to be lowered.

Accordingly, as one example, the address mapping information 470-1 stored in the RAM 470 may be stored in the disk 12 or the non-volatile memory device 490 according to the following conditions.

Upon reception of a system end command, the address mapping information management processor 430-2 may store the address mapping information 470-1, which is stored in the RAM 470, in the disk 12 or the non-volatile memory device 490.

After storing the address mapping information 470-1 stored in the RAM 470 in the disk 12 or the non-volatile memory device 490, the address mapping information management processor 430-2 may delete the address mapping recovery information 470-2 stored in the RAM 470. That is, the address mapping information management processor 430-2 may perform a process of storing the address mapping information 470-1 stored in the RAM 470 in the disk 12 or the non-volatile memory device 490 and then deleting the address mapping recovery information 470-2 stored in the RAM 470.

When the address mapping recovery information 470-2 is fully stored in the size allocated in the RAM 470, the address mapping information management processor 430-2 may perform a process of writing the address mapping recovery information 470-2 stored in the RAM 470 onto the user data area of the disk 12. In detail, the address mapping information management processor 430-2 may perform a process of writing the address mapping recovery information 470-2 stored in the RAM 470 to a sector right after a sector on which the previous data has been written.

The address mapping information management processor 430-2 may store a physical address PBA of the disk 12, on which the address mapping recovery information 470-2 has been written, in rPrevPBA of the address mapping recovery information 470-2 allocated in the RAM 470. After writing the address mapping recovery information 470-2 stored in the RAM 470 on the user data area of the disk 12, the address mapping information management processor 430-2 may delete rLog0 to rLogN members included in the address mapping recovery information 470-2, which is configured as illustrated in FIG. 17 and stored in the RAM 470.

The address mapping information management processor 430-2 may store the address mapping recovery information 470-2, which has been stored in the RAM 470, in the non-volatile memory device 490 using preliminary power when an abnormal power off occurs.

For reference, the power control processor 430-1 may determine that the abnormal power off has occurred when a voltage of power applied to the storage device is lowered below a threshold voltage without generation of a power off control signal.

Accordingly, when the power control processor 430-1 has determined that the abnormal power off has occurred, the address mapping information management processor 430-2 may store the address mapping recovery information 470-2, which has been stored in the RAM 470, in the non-volatile memory device 490.

Figure 29A:
FIG. 29A is an overview illustrating an allocated state of virtual bands with respect to logical bands prior to updating address mapping information in accordance with one exemplary embodiment.
Figure 29A:
Figure 29A:
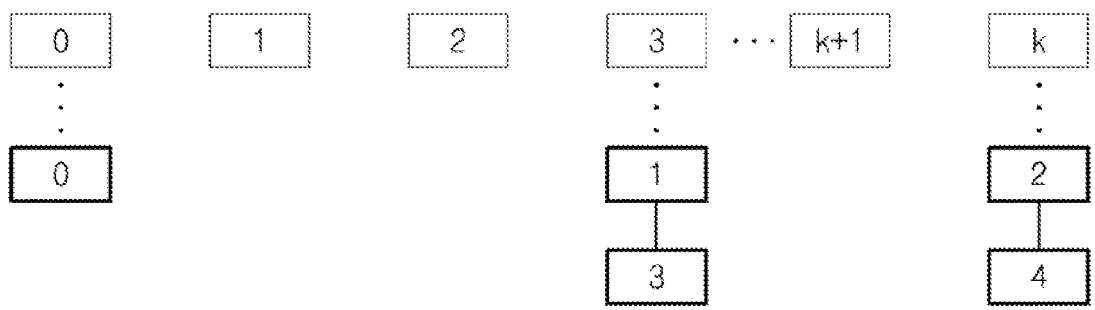
Figure 29B:
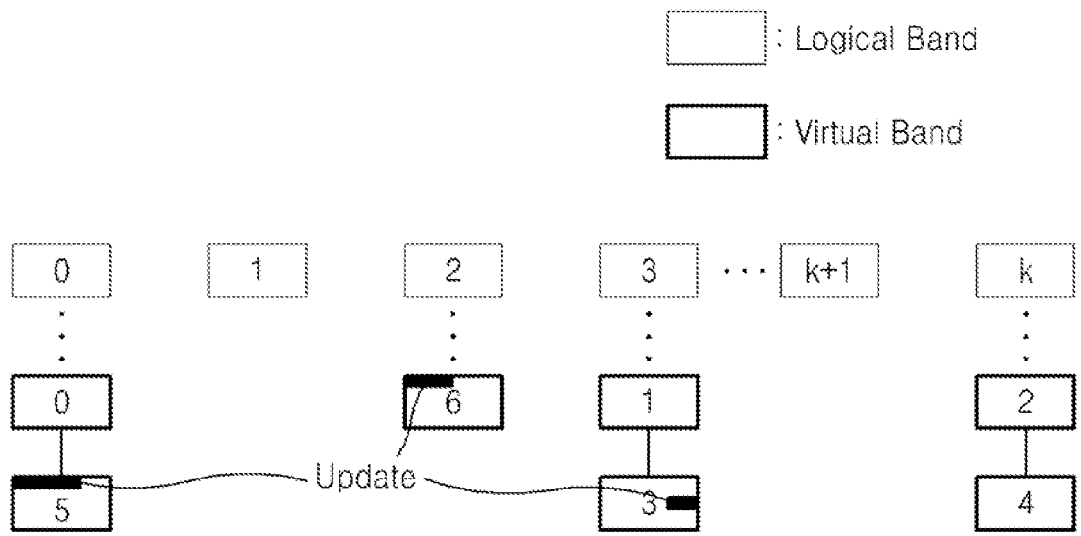
FIG. 29B is an overview illustrating an allocated state of virtual bands with respect to logical bands according to a data writing process after storing address mapping information in accordance with one exemplary embodiment.

For example, it is assumed that after address mapping information including the allocation state of virtual bands with respect to logical bands as illustrated in FIG. 29A is loaded from the disk 12 or the non-volatile memory device 490 into the RAM 470, the address mapping information stored in the RAM 470 has changed to address mapping information including the allocation state of virtual bands with respect to logical bands as illustrated in FIG. 29B in response to execution of the write command. It is also assumed that power has abnormally been cut off before the address mapping information, which was stored in the RAM 470 and configured with the logical bands and the virtual bands as illustrated in FIG. 29B, is stored in the disk 12 or the non-volatile memory device 490.

The address mapping information configured with the logical band and the virtual bands as illustrated in FIG. 29A is shown in FIG. 30.

Referring to FIG. 30, a virtual band (VB) 0 is allocated to a logical band (LB) 0, and the last accessed virtual address (LAVA) on the virtual band 0 is 199. Virtual bands 1 and 3 are allocated to a logical band 3, the last accessed virtual address on the virtual band 1 is 199, and the last accessed virtual address on the virtual band 3 is 101. Virtual bands 2 and 4 are allocated to a logical band K, the last accessed virtual address on the virtual band 2 is 199, and the last accessed virtual address on the virtual band 4 is 145.

A unit virtual band may include virtual addresses 0 to 199. That is, the unit virtual band may include 200 sectors. Therefore, virtual bands on which the last accessed virtual address is 199 correspond to virtual bands without available virtual addresses, which may be allocated to LBAs.

The address mapping information, as illustrated in FIG. 30, which has been stored in the disk 12 or the non-volatile memory device 490 when the disk drive is initialized, may be loaded into the RAM 470. Also, the address mapping information, which has been stored in the disk 12 or the non-volatile memory device 490 when the disk drive is initialized and includes a mapping relation between LBAs and corresponding VAs for each virtual band allocated to a logical band, may be loaded to the RAM 470.

Figures 37, 38:
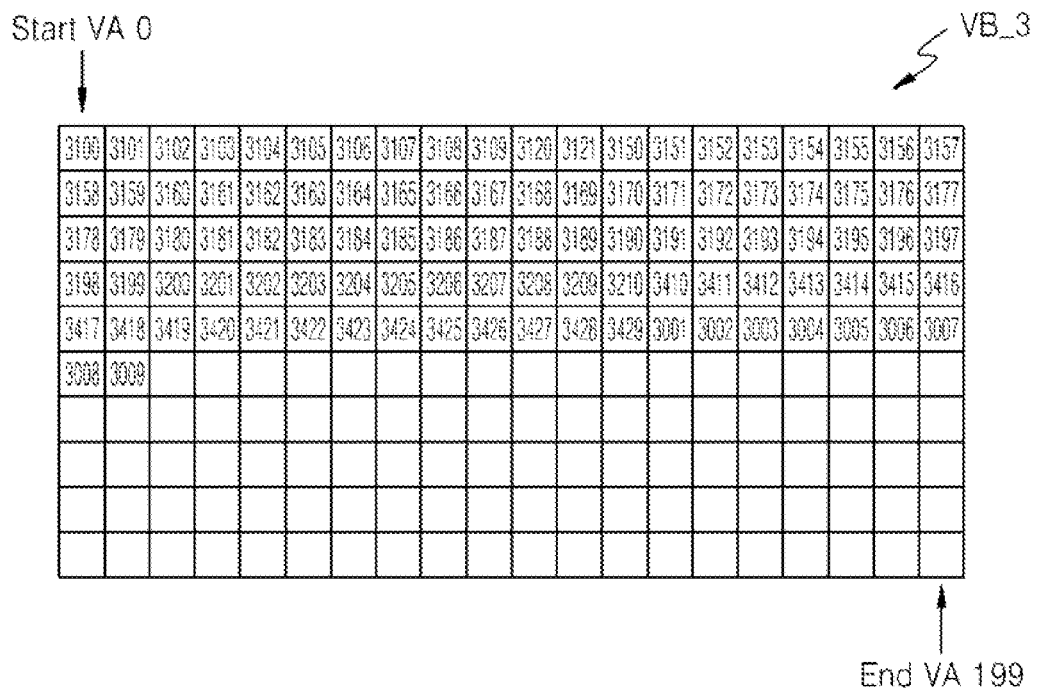
FIG. 37 is a view illustrating a mapping relation between LBAs and VAs on a virtual band number 3 illustrated in FIG. 29A.
FIG. 38 is a view illustrating address mapping information related to the virtual band number 3 illustrated in FIG. 37.

As one example, when an allocation structure of VAs with respect to LBAs of the virtual band 3 allocated to the logical band 3 is the same as illustrated in FIG. 37, address mapping information, which indicates the mapping relation between LBAs and VAs with respect to the virtual band 3 may be represented as illustrated in FIG. 38. Accordingly, address mapping information as illustrated in FIG. 38, which indicates the mapping relation between LBAs and VAs on the virtual band 3, may be loaded into the RAM 470.

According to the above method, those address mapping information, which indicate the mapping relation between LBAs and VAs on the other virtual bands allocated to the logical band, may be loaded into the RAM 470.

Next, during the process that the address mapping information stored in the RAM 470 changes to the address mapping information configured by the logical bands and the virtual bands as illustrated in FIG. 29B in response to execution of the write command, the address mapping information management processor 430-2 may generate address mapping recovery information as illustrated in FIGS. 31A to 31C in a sequential manner.

Referring to FIGS. 17 and 31A, a NULL value may be stored in rPrevPBA included in an initial address mapping recovery information. The address mapping information management processor 430-2 may store mapping information related to LBAs and PBAs, generated in response to the execution of the write command, in rLog0 to rLogN of the address mapping recovery information in a sequential manner. The one exemplary embodiment of the present disclosure has illustrated under assumption that the maximum number of rLog members which can be stored in the RAM 470 is 10.

Referring to FIG. 31A, when no more rLog is able to be stored in an address mapping recovery information list due to 10 rLog members being fully stored, the address mapping information management processor 430-2 may execute a process of writing address mapping recovery information I1, which was stored in the RAM 470 with a value as illustrated in FIG. 31A, onto a sector (rPrevPBA1) right after a disk sector on which the latest data write operation has been executed.

The address mapping information management processor 430-2 may store the sector position information (i.e., rPrevPBA1) on which the address mapping recovery information has been written on the disk, in rPrevPBA of the address mapping recovery information allocated in the RAM 470, and delete rLog lists.

When the address mapping recovery information becomes full again as illustrated in FIG. 31B due to 10 rLog members being newly stored in the address mapping recovery information in response to the following write operation, the address mapping information management processor 430-2 may execute a process of writing address mapping recovery information I2, which has been stored in the RAM 470, as illustrated in FIG. 31B, onto a sector (rPrevPBA0) right after a disk sector on which the latest write operation has been performed.

The address mapping information management processor 430-2 may then store the sector position information (i.e., rPrevPBA0) on which the address mapping recovery information has been written on the disk, in rPrevPBA of the address mapping recovery information allocated in the RAM 470, and delete rLog lists.

Figure 18:
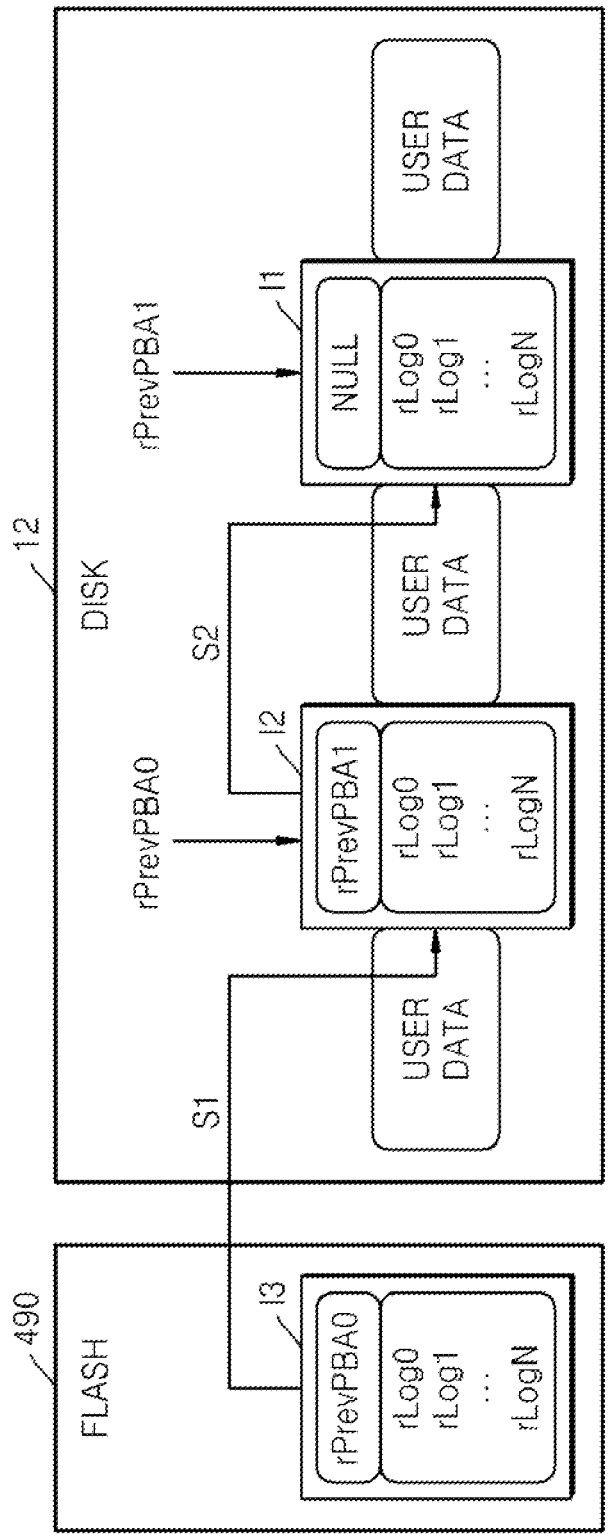
FIG. 18 is a view illustrating an address mapping information recovering process in accordance with the present disclosure.

When an abnormal power off occurs after address mapping recovery information I3 as illustrated in FIG. 31C is stored in the RAM 470 due to generation of 5 new rLog being generated in the address mapping recovery information in response to the following write operation, the address mapping information management processor 430-2 may store the address mapping recovery information I3, which is configured as illustrated in FIG. 31C and stored in the RAM 470, in the non-volatile memory device 490, Consequently, as illustrated in FIG. 18, those address mapping recovery information I1 to I3 as illustrated in FIGS. 31A to 31C, may be stored in the disk 12 or the non-volatile memory device 490.

The address mapping information management processor 430-2 may check whether or not the address mapping recovery information is stored in the non-volatile memory device 490 when power is supplied to the disk drive. If the address mapping recovery address is stored in the non-volatile memory device 490, the address mapping information management processor 430-2 may read the address mapping recovery information I3 out of the non-volatile memory device 490 so as to store in the RAM 470.

Afterwards, the address mapping information management processor 430-2 may read the address mapping recovery information from a physical address of the disk stored in the rPrevPBA until a NULL value is detected from the rPrevPBA of the address mapping recovery information, and store the read address mapping recovery information in the RAM 470.

That is, the address mapping information management processor 430-2 may search for the rPrevPBA0, as the physical address of the disk, stored in the rPrevPBA of the address mapping recovery information I3 read from the non-volatile memory device 490, and read the address mapping recovery information I2 stored in the rPrevPBA0 to store in the RAM 470 (S1 of FIG. 18). Next, the address mapping information management processor 430-2 may search for rPrevPBA1, as the physical address of the disk, stored in rPrevPBA of the address mapping recovery information I2, and read the address mapping recovery information I2 stored in the rPrevPBA1 to store in the RAM 470 (S2 of FIG. 18). The address mapping information management processor 430-2 may terminate the process of reading the address mapping recovery information since the rPrevPBA value of the address mapping recovery information I1 is NULL.

The address mapping information management processor 430-2 may also read the address mapping information 470-1 stored in the disk 12 or the non-volatile memory device 490 and store the read data in the RAM 470 when power is supplied to the disk drive.

Accordingly, the RAM 470 may store the address mapping information, which indicates the mapping relation between logical bands and virtual bands as illustrated in FIG. 30, and the address mapping information, which indicates the mapping relation between LBA and VAs for each virtual band allocated to a logical band.

The address mapping information management processor 430-2 may update the address mapping information stored in the RAM 470, as follows, by using rLog information included in the address mapping recovery information I1 to 13, which have been read out of the disk 12 or the non-volatile memory device 490 and then stored in the RAM 470.

First, description will be given of a method of updating address mapping information using the address mapping recovery information I3 as illustrated in FIG. 31C.

It may be checked whether or not a virtual band for rLog information included in the address mapping recovery information I3 has been allocated to address mapping information. Referring to FIG. 31C, PBAs of the rLog information included in the address mapping recovery information I3 may be 1000 to 1004. It is assumed that a logical band is set to 1000 LBA units and a virtual band is set to 200 PBA units. Accordingly, PBAs 0 to 199 are designated to a virtual band VB_0, PBAs 200 to 399 are designated to a virtual band VB_1, PBAs 400 to 599 are designated to a virtual band VB_2, . . . , etc. Therefore, since the PBAs of the rLog information included in the address mapping recovery information I3 are 1000 to 1004, the PBAs are included in a virtual band VB_5. Also, since the rLog information included in the address mapping recovery information I3 is included in the range of LBAs 0 to 999, it corresponds to a logical band LB_0.

Figures 33, 34:
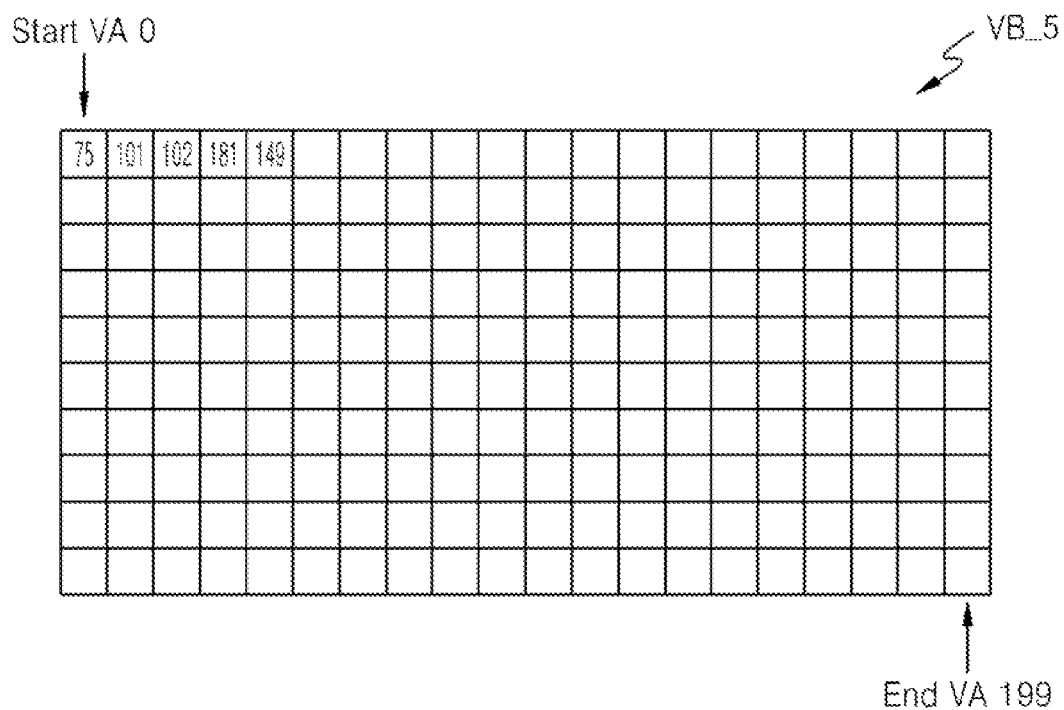
FIG. 33 is a view illustrating a mapping relation between LBAs and VAs on a virtual band number 5 where address mapping information has been updated based on the address mapping recovery information illustrated in FIGS. 31A to 31C.
FIG. 34 is a view illustrating address mapping information related to the virtual band number 5 illustrated in FIG. 33.

Referring to FIG. 30, since a virtual band VB_5 has not been allocated to the logical band LB_0 for the rLog information included in the address mapping recovery information I3, the address mapping information management processor 430-2 may newly allocate the virtual band VB_5 to the logical band LB_0 in the address mapping information. For reference, the correspondence of LBAs to virtual addresses VAs of the virtual band VB_5 based on the address mapping recovery information I3 is illustrated in FIG. 33. Referring to FIG. 33, the last accessed VA on the VB_5 is 4.

Hence, the virtual band VB_5 may be newly allocated to the logical band LB_0, as illustrated in FIG. 32, and the LA VA 4 for the VB_5 may be stored. Next, the mapping information related to VAs with respect to LBAs on VA_5 as illustrated in FIG. 33 may be generated as illustrated in FIG. 34, so as to be added to the address mapping information related to the virtual band VB_5 stored in the RAM 470. Referring to FIG. 34, LBA 75 is mapped on a sector of VA 0, LBAs 101-102 are mapped on two consecutive sectors including VA 1, LBA 181 is mapped on a sector of VA 3, and LBA 149 is mapped on a sector of VA 4.

Hereinafter, description will be given of a method of updating address mapping information using the address mapping recovery information (I1 and I2) as illustrated in FIGS. 31A and 31B.

It may be checked whether or not a virtual band for rLog information included in the address mapping recovery information I2 has been allocated to address mapping information. Referring to FIG. 31B, since LBAs of the rLog information included in the address mapping recovery information I2 are included in the range of 2000 to 2999, the LBAs correspond to a logical band LB_2. PBAs are included in the range of 1200 to 1399, so they correspond to a virtual band VB_6. Referring to FIG. 30, since the virtual band VB_6 has not been allocated to the logical band LB_2 for the rLog information included in the address mapping recovery information I2, the address mapping information management processor 430-2 may newly allocate the virtual band VB_6 to the logical band LB_2 on the address mapping information.

Virtual bands for the rLog information included in the address mapping recovery information I1 may be included in a logical band LB_3 or LB-2, and included in a virtual band VB_3 or VB_6. The virtual band VB_3 has been already allocated on the logical band LB_3 in the address mapping information, and the virtual band VB_6 has been newly allocated to the logical band LB_2 using the address mapping recovery information I2, so there is no need to additionally allocate a virtual band.

Figures 35, 36:
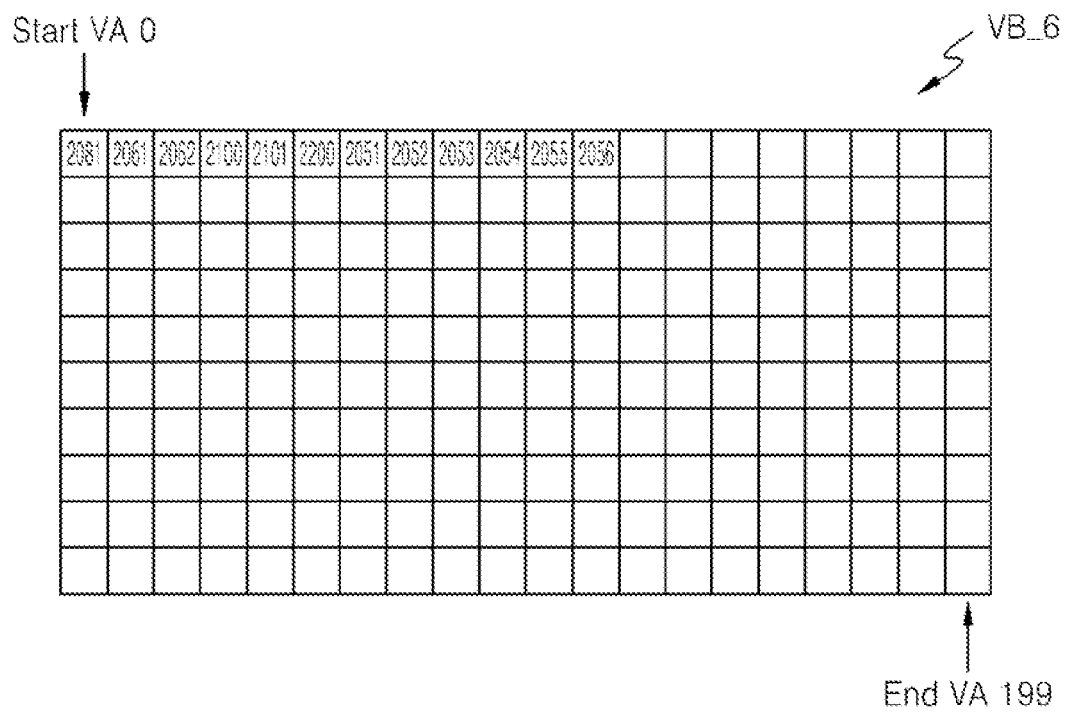
FIG. 35 is a view illustrating a mapping relation between LBAs and VAs on a virtual band number 6 where address mapping information has been updated based on the address mapping recovery information illustrated in FIGS. 31A to 31C.
FIG. 36 is a view illustrating address mapping information related to the virtual band number 6 illustrated in FIG. 35.

Next, a correspondence of LBAs to VAs of the virtual band VA_6 based on the address mapping recovery information (I1 and I2) is illustrated in FIG. 35. Referring to FIG. 35, the last accessed VA on VB_6 is 11.

Therefore, as illustrated in FIG. 32, the virtual band VB_6 is newly allocated to the logical band LB_2, and LA VA 11 is stored with respect to VB_6. The mapping information related to the VAs with respect to LBAs on the VB_6 as illustrated in FIG. 35 is added to the address mapping information related to the virtual band VB_6 stored in the RAM 470 as illustrated in FIG. 36. Referring to FIG. 36, LBAs 3051 to 3056 are mapped on 6 consecutive sectors including VA 6 on the virtual band VB_6, and LBAs 3061 to 3062 are mapped on 2 consecutive sectors including VB 1, LBA 3081 is mapped on a sector of VA 0, LBAs 3100 to 3101 are mapped on two consecutive sectors including VA 3, and LBA 3200 is mapped on a sector of VA 5.

When the allocation structure, as illustrated in FIG. 29A, of VAs with respect to LBAs on the VB_3, which is allocated to the logical band LB_3 prior to updating of the address mapping information, is the same as being illustrated in FIG. 37, address mapping information indicating the mapping state of VAs corresponding to LBAs on the virtual band VB_3 may be represented as illustrated in FIG. 38.

Figures 39, 40:
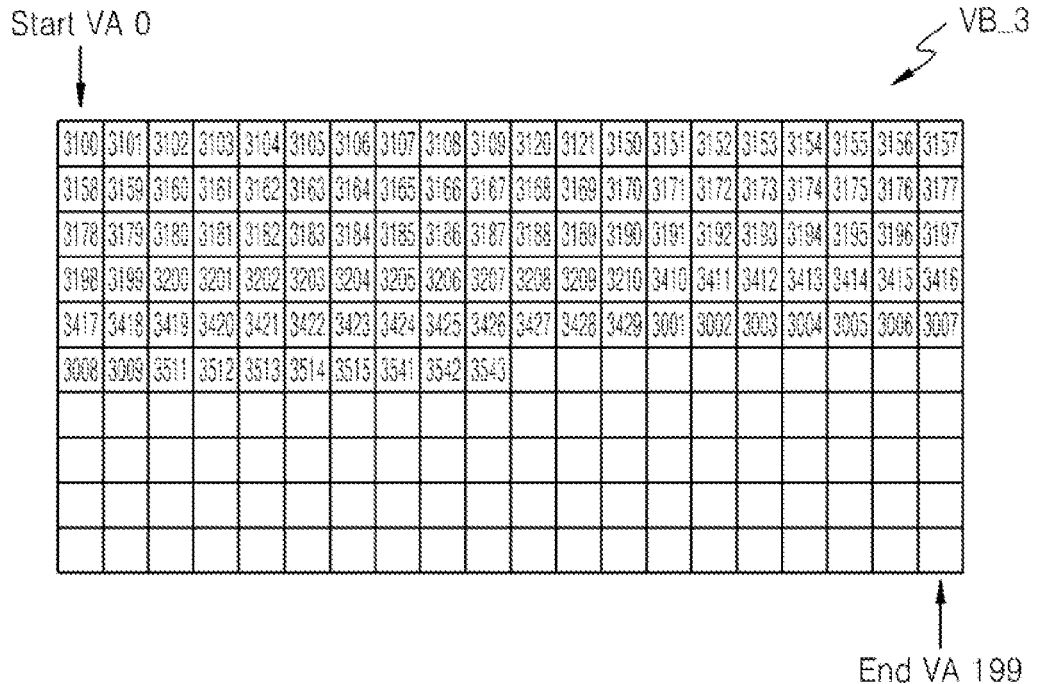
FIG. 39 is a view illustrating a mapping relation between LBAs and VAs on a virtual band number 3 where address mapping information has been updated based on the address mapping recovery information illustrated in FIGS. 31A to 31C.
FIG. 40 is a view illustrating address mapping information related to the virtual band number 3 illustrated in FIG. 39.

A correspondence of LBAs to VAs of the virtual band VB_3 based on the address mapping recovery information I1 is illustrated in FIG. 39. When the mapping information related to VAs with respect to LBAs, added on the virtual band VB_3 based on the address mapping recovery information I1, is added to the address mapping information related to VB_3 as illustrated in FIG. 38, address mapping information related to an updated VB_3 as illustrated in FIG. 40 is generated. Also, in FIG. 32, the last accessed virtual address LA VA on the virtual band VB_3 allocated to the logical band LB_3 may be updated to 109.

The address mapping information management processor 430-2 may update the address mapping information stored in the RAM 470 through the aforementioned process, and store the updated address mapping information in the disk 12 or the non-volatile memory device 490. Afterwards, the address mapping information management processor 430-2 may delete the address mapping recovery information stored in the RAM 470 and the non-volatile memory device 490.

When both data and a logical block address corresponding to the data are written on the storage medium 150 upon execution of a write operation, physical addresses for positions of the data, which were written on the storage medium 150 without being reflected in the address mapping information, may be stored in rLog0 to rLogN of the address mapping recovery information, respectively. Here, the address mapping information management processor 430-2 may generate the address mapping recovery information as illustrated in FIGS. 31A to 31C by reading LBA, which is stored in a spare area of a sector, which corresponds to the physical address of the storage medium 150 designated by the rLog of the address mapping recovery information, which was read out of the non-volatile memory device 170 or the storage medium 150 upon the occurrence of the abnormal power off. The generated address mapping recovery information may be stored in the RAM 470.

The address mapping information management processor 430-2 may recover the address mapping information by such method using the address mapping recovery information even when the abnormal power off occurs.

Referring back to FIG. 14, the address conversion processor 430-3 may perform a process of converting LBA designated by a received command into physical position information related to the storage medium using virtual bands and virtual addresses. A detailed configuration of the address conversion processor 430-3 is illustrated in FIG. 15.

Figure 15:
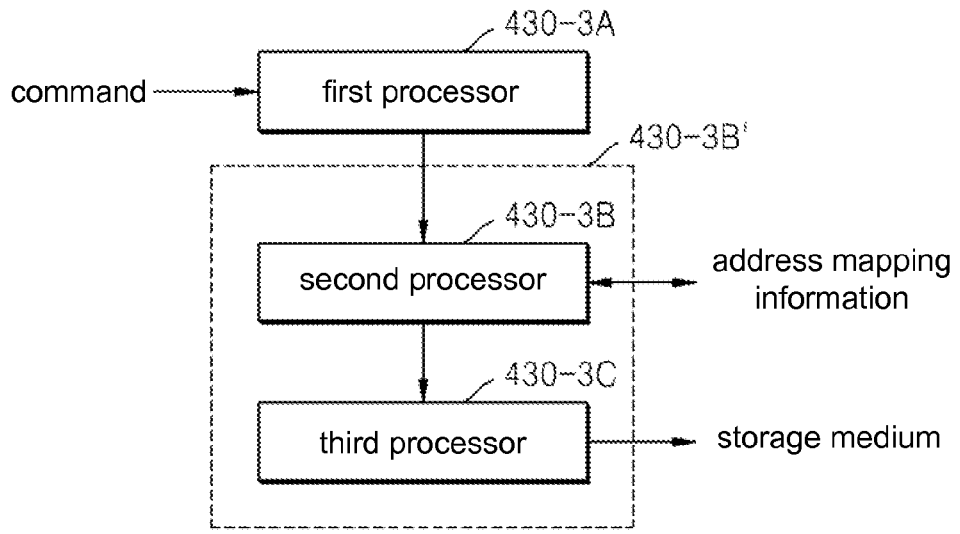
FIG. 15 is a detailed view illustrating an address conversion processor illustrated in FIG. 14.

Referring to FIG. 15, the address conversion processor 430-3 may include a first processor 430-3A, a second processor 430-3B and a third processor 430-3C. Here, the second processor 430-3B and the third processor 430-3C may be designed as one integrated processor 43-3B'. Although not shown, the first processor 430-3A and the second processor 430-3B may also be integrated into one processor.

The processor 430-3A may extract LBA designated by the received command.

The second processor 430-3B may convert the LBA extracted by the first processor 430-3A into a virtual address. That is, the second processor 430-3B may search for the address mapping information 470-1 and convert LBA into a virtual address.

The second processor 430-3B may find a virtual band and virtual address corresponding to the LBA designated by a read command based on the address mapping information stored in the RAM 470.

The second processor 430-3B may allocate a virtual band and virtual address corresponding to the LBA designated by a write command, as follows.

Referring to FIG. 16, the second processor 430-3B may include a free queue 131, an allocation queue 132, and a garbage queue 133. The second processor 430-3B may convert LBA designated by the write command into a virtual address using the free queue 131, the allocation queue 132 and the garbage queue 133.

The second processor 430-3B may store information related to virtual bands, which have not been allocated to a logical band, in the free queue 131 in a preset order. The free queue 131 is an element in which information related to virtual bands to be allocatable to a logical band according to a command are stored and waited for selection. The free queue 131 may store those information related to virtual bands to be allocatable to a logical band for each physical zone in a sorting manner.

The second processor 430-3B may store information related to virtual bands allocated to the logical band in the allocation queue 132. In detail, when a virtual band allocated to a logical band including LBA designated by the write command is not present in the address mapping information 470-1 or every virtual address has completely been allocated on virtual bands allocated to the logical band including the LBA designated by the write command, the second processor 430-3B may select one virtual band waited in the free queue 131 and allocate the one virtual band to the logical band including the LBA designated by the write command so as to move to the allocation queue 132 (P1).

Next, the second processor 430-3B may allocate a virtual address corresponding to the LBA designated by the write command based on the virtual band allocated to the logical band stored in the allocation queue 132. In detail, when a new virtual address is allocated to the logical band including the LBA designated by the write command and stored in the allocation queue 132, the second processor 430-3B may allocate the newly allocated virtual address corresponding to a first sector of the logical band to the LBA designated by the command.

When a virtual band which has already been allocated to the logical band including the LBA designated by the write command is present in the allocation queue 132, the second processor 430-3B may allocate a virtual address which is left without being allocated in the corresponding virtual band to the LBA designated by the write command. As one example, the second processor 430-3B may allocate a virtual address for a sector right after a sector, which is last accessed on the virtual band, to the LBA designated by the write command.

The second processor 430-3B may select a virtual band, in which the number of virtual addresses invalidated due to data update exceeds a threshold value, from the virtual bands allocated to the logical band, and move the selected virtual band to the garbage queue 133 (P2).

For example, when the number of virtual bands stored in the free queue 131 is less than an initially set minimum value, the second processor 430-3B performs a garbage collection process. That is, the second processor 430-3B reads data stored in a sector of valid virtual addresses in the virtual band stored in the garbage queue 133, and rewrites the data to a virtual address defined in a newly allocated virtual band from the free queue 131.

The second processor 430-3B may move information related to the virtual band, in which the rewriting has been performed, of the virtual bands stored in the garbage queue 133, to the free queue 131 (P3).

The third processor 430-3C may convert the virtual address converted by the second processor 430-3B into a physical address of the disk, and control the storage device to access the storage medium according to the converted physical address. That is, the third processor 430-3C may convert the virtual address into Cylinder Head Sector (CHS) information indicating the physical position of the disk, and generate a VCM driving control signal for accessing the disk based on the converted CHS information.

Referring to FIG. 4, when the VCM driving control signal generated by the third processor 430-3C is applied to the VCM driving unit 440, the VCM driving unit 440 generates a VCM driving current corresponding to the VCM driving control signal and supplies the current to a VCM 30. In turn, the magnetic head 16 is moved to a track position of a disk desired to access, and performs a data write or read operation corresponding to a command.

Hereinafter, description will be given of a method of managing address mapping information in accordance with one exemplary embodiment, executed by the control of the processor 110 illustrated in FIG. 1 or the processor 430 illustrated in FIG. 4, with reference to FIG. 19.

The processor 110 may perform a process S101 of generating address mapping recovery information in response to a write operation, and a process (S102) of writing the generated address mapping recovery information to a user data area of the storage medium 150 in an initially set size unit. A detailed embodiment for the steps S101 and S102 will be described with reference to FIG. 20.

First, the processor 110 generates address mapping recovery information in response to a write operation (S201). The operation of generating the address mapping recovery information has been described in FIG. 17, so description thereof will be omitted. A NULL value as an initial value is stored in rPrevPBA of the address mapping recovery information illustrated in FIG. 17.

The processor 110 stores the address mapping recovery information generated in the step S201 in a recovery information storage area allocated in the RAM 130 (S202). The size allocated in the RAM 130 for the address mapping recovery information may be limited. In detail, a storage space for storing the address mapping recovery information as illustrated in FIG. 17 is allocated in the RAM 130, and the maximum number of rLog members to be stored may be limited. The size allocated in the RAM 130 for the address mapping recovery information may be set to be smaller than a storage capacity to be writable on the non-volatile memory device 170 upon the occurrence of the abnormal power off in the drive. For the sake of explanation, the maximum number of rLog members to be stored in the RAM 130 has been set to 10, for example. However, the present disclosure may not be limited to this.

The processor 110 determines whether or not the address mapping recovery information has been fully stored in the recovery information storage area allocated in the RAM 130 (S203). That is, under assumption that the number of rLog members to be stored in the RAM 130 is set to 10, when 10 rLog members have been stored, it means that the information is fully stored.

When it is determined in the step S203 that the address mapping recovery information is fully stored in the RAM 130, the processor 110 writes the address mapping recovery information stored in the RAM 130 on a user data area of a disk as the storage medium 150 (S204).

Afterwards, the processor 110 stores a physical address PBA of the disk, on which the address mapping recovery information has been written, in rPrevPBA allocated in the RAM 130 (S205). Also, the processor 110 deletes rLog members of the address mapping recovery information stored in the RAM 130 (S206).

Figure 19:
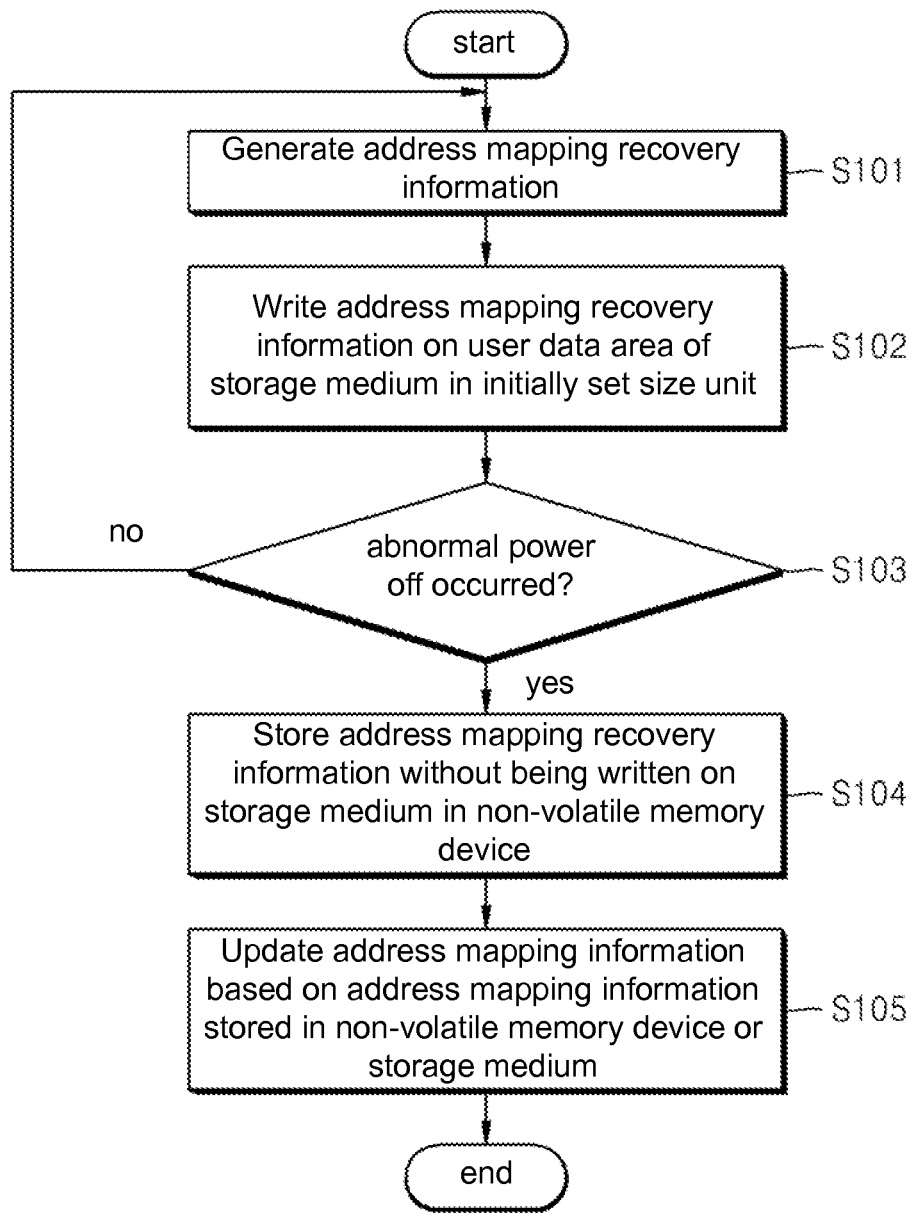
FIG. 19 is a flowchart illustrating a method for managing address mapping information in accordance with one exemplary embodiment.
Figure 20:
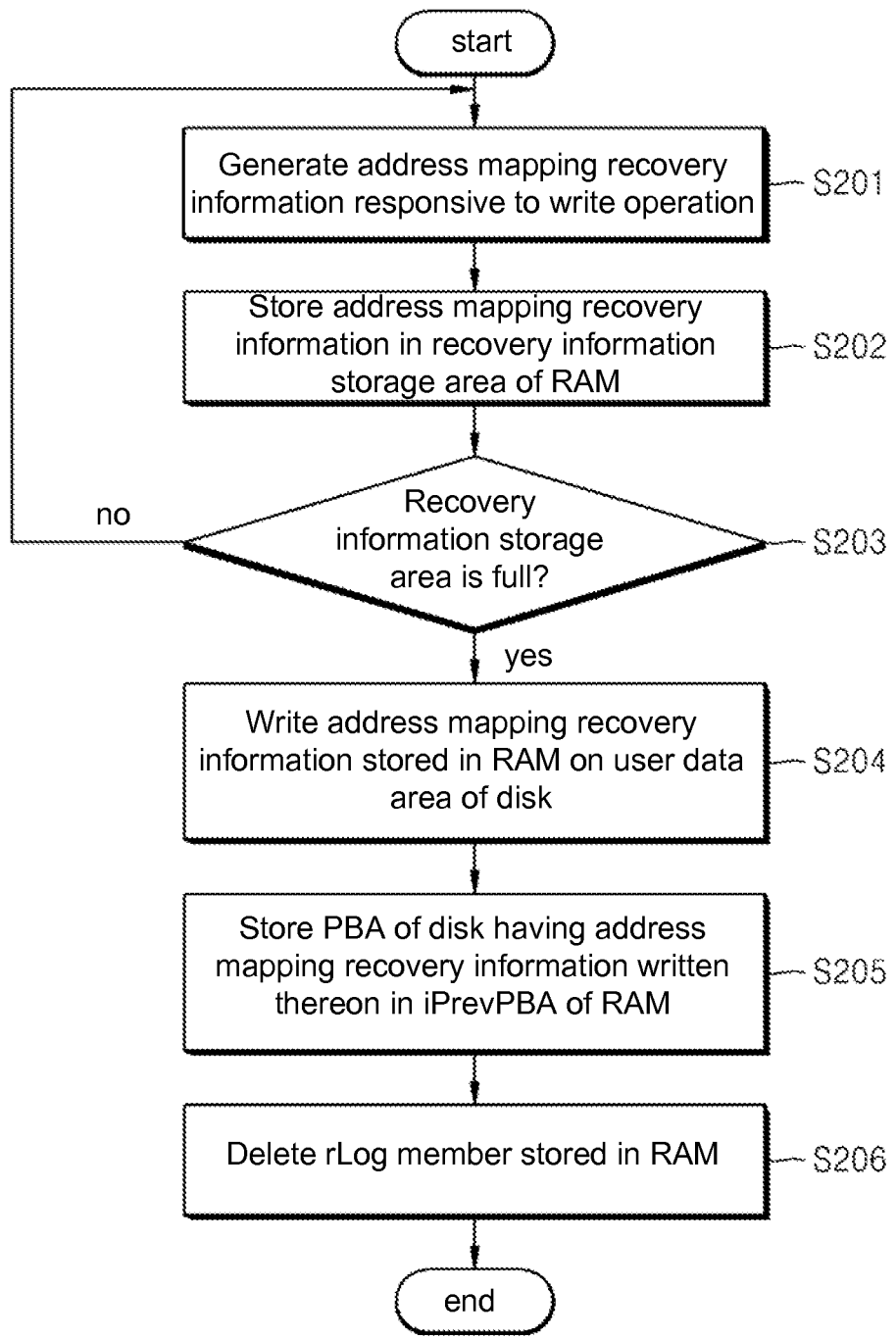
FIG. 20 is a detailed flowchart illustrating a process of generating address mapping information and a process of writing address mapping recovery information in a storage medium illustrated in FIG. 19.

The steps S101 and S102 illustrated in FIG. 19 may be executed through those operations.

Figure 21:
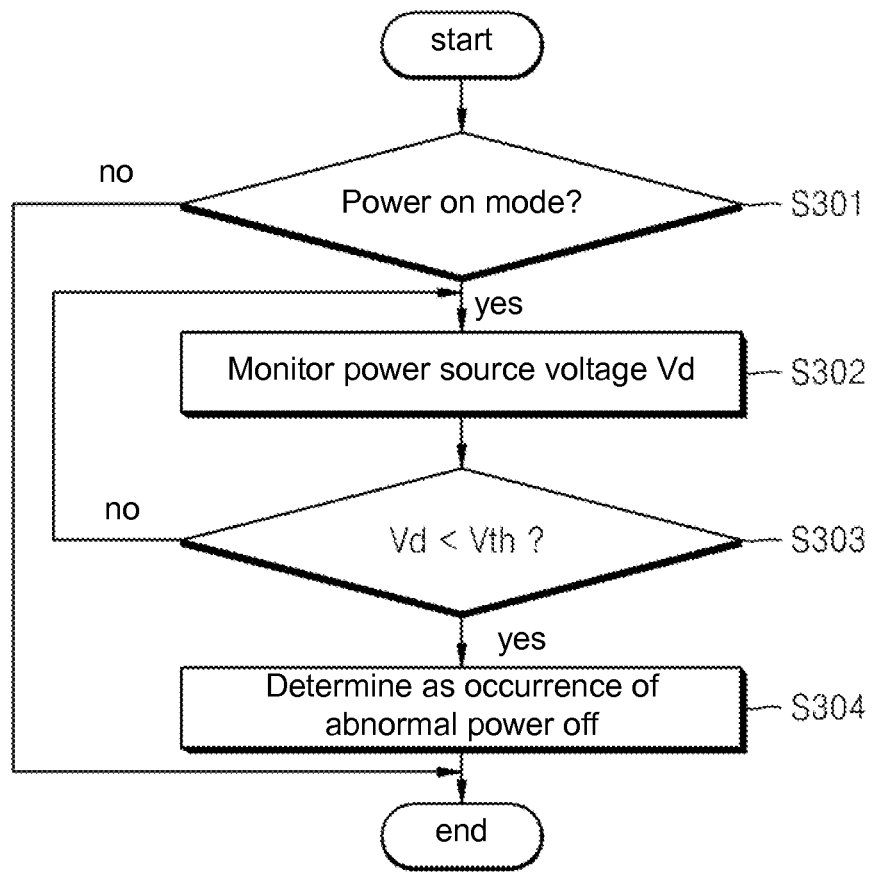
FIG. 21 is a detailed flowchart illustrating a process of determining whether or not an abnormal (sudden) power off occurs illustrated in FIG. 19.

Referring back to FIG. 19, after performing the step S102, the processor 110 determines that an abnormal power off has occurred in the storage device (S103). As one example, the processor 110 may determine that the abnormal power off has occurred when a power source voltage is dropped below a threshold value without generation of a power off control signal. A detailed example of determining the abnormal power off is illustrated in FIG. 21.

A process of determining whether or not the abnormal power off has occurred will be described with reference to FIG. 21.

The processor 110 determines whether or not the storage device is in a power on mode (S301). The power on mode is a mode that power is supplied to the storage device. Once the storage device is converted into the power on mode, such mode is maintained unless a command such as a system termination or the like is generated. Also, when such command, for example, the system termination or the like is not generated in the power on mode, the power off control signal may not be generated.

The processor 110 monitors a power source voltage Vd while the storage device remains in the power on mode (S302).

The processor 110 compares the monitored power source voltage Vd with a threshold voltage Vth (S303). Here, the threshold voltage Vth may be set to a value obtained by adding a predetermined margin voltage to a minimum voltage which allows the processor 110 to normally operate. Of course, the threshold voltage Vth may be set to be lower than a normal power source voltage.

The processor 110 determines that the abnormal power off has occurred when the monitored power source voltage Vd is dropped below the threshold voltage Vth (S304).

According to the method, the abnormal power off state may be determined.

Referring back to FIG. 19, if it is determined in the step S103 that the abnormal power off has occurred, the processor 110 stores the address mapping recovery information, which has not been written on the storage medium 150, in the non-volatile memory device 170 using preliminary power (S104). That is, the address mapping recovery information stored in the RAM 130 may be stored in the non-volatile memory device 170.

When power is supplied to the storage device again, the processor 110 updates the address mapping information stored in the storage medium 150 or the non-volatile memory device 170 based on the address mapping recovery information stored in the non-volatile memory device 170 or the storage medium 150 (S105).

Figure 22:
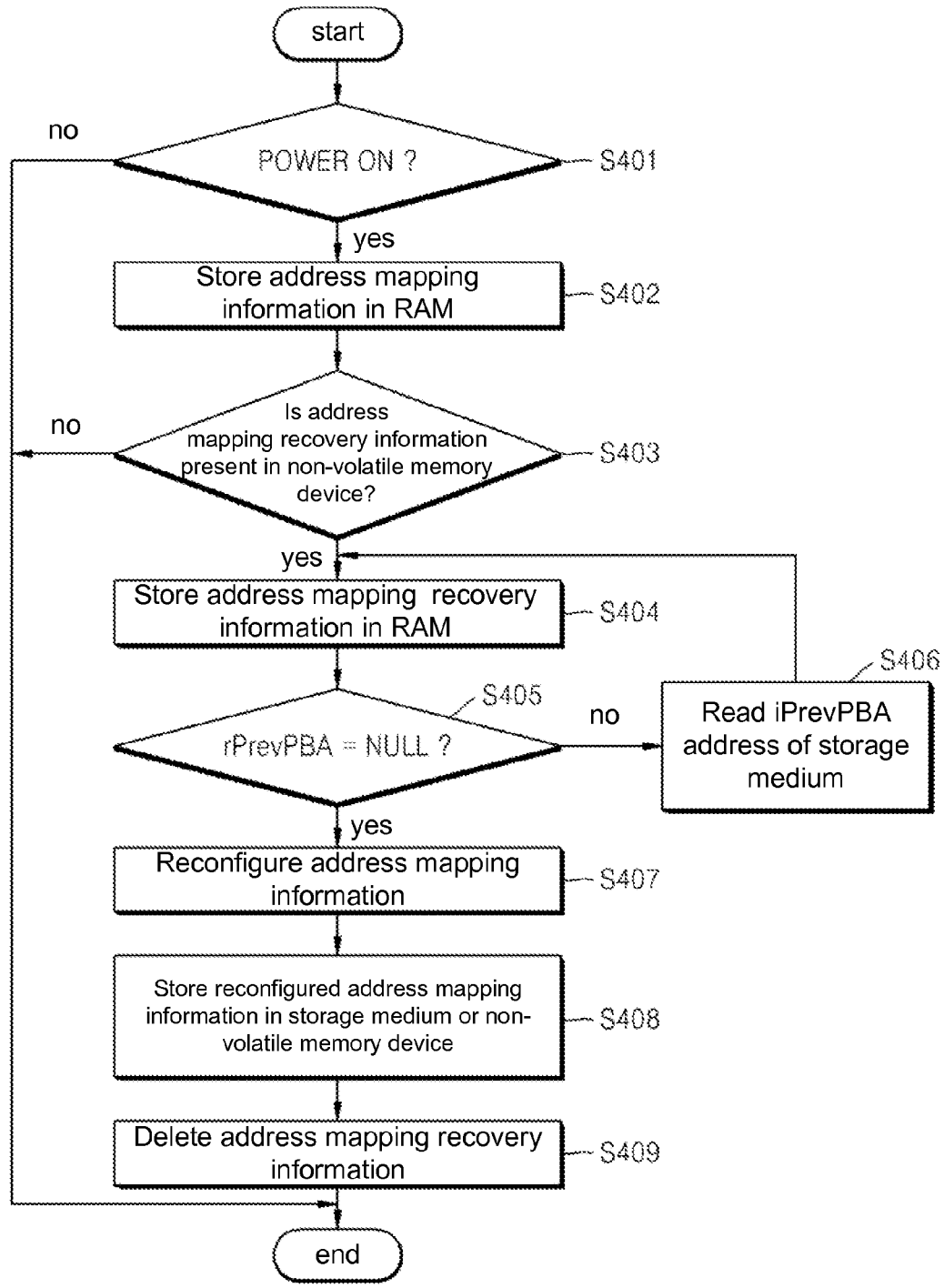
FIG. 22 is a detailed flowchart illustrating one exemplary embodiment of a process of updating address mapping information illustrated in FIG. 19.
Figure 23:
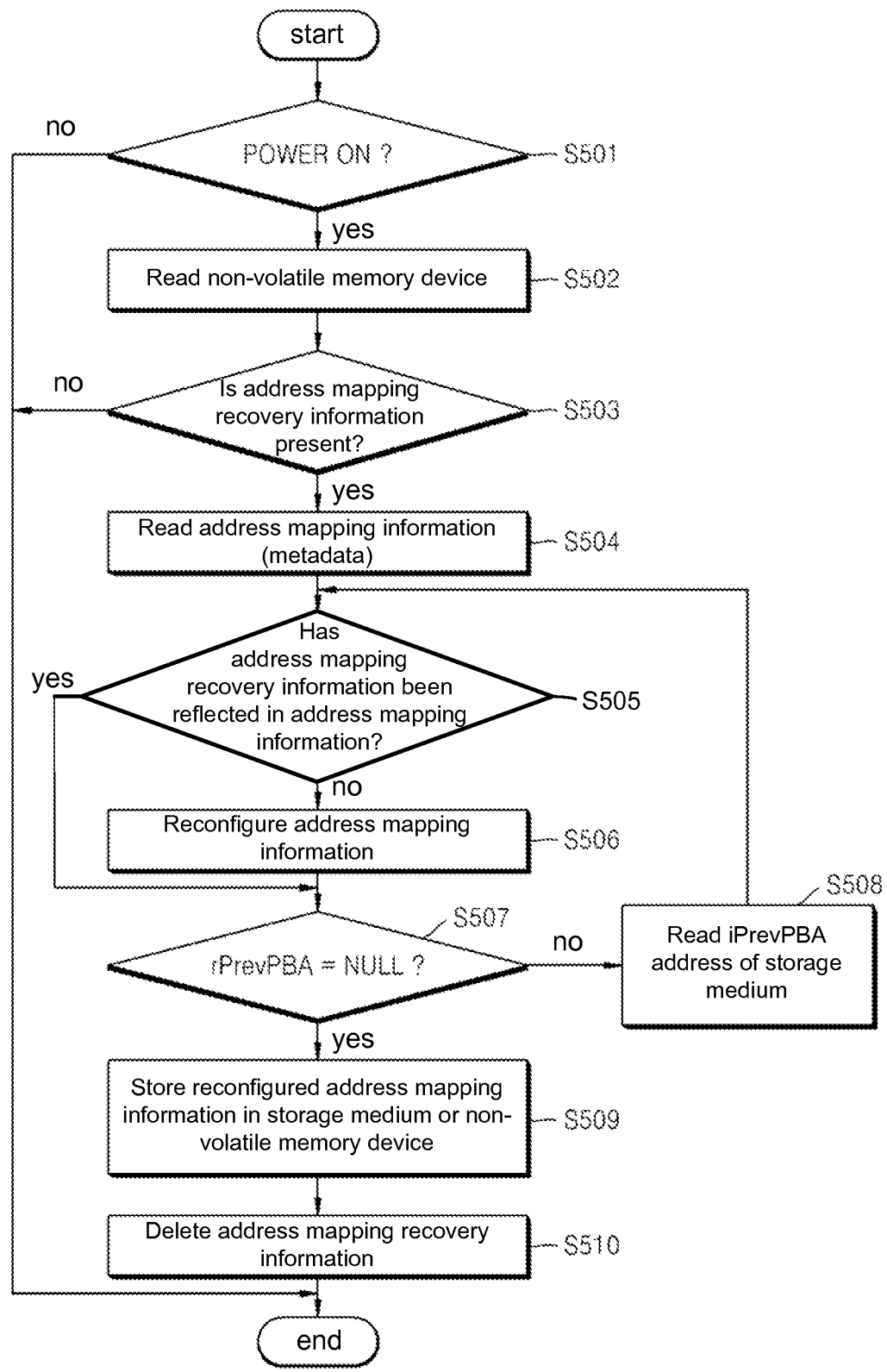
FIG. 23 is a detailed flowchart illustrating another exemplary embodiment of the process of updating address mapping information illustrated in FIG. 19.

Hereinafter, an exemplary embodiment of updating the address mapping information based on the address mapping recovery information will be described in detail with reference to FIGS. 22 and 23.

First, description will be given of updating the address mapping information in accordance with one exemplary embodiment with reference to FIG. 22.

The processor 110 determines whether or not the storage device is in the power on mode that power is supplied (S401). That is, the processor 110 determines whether or not the storage device has transited from a power off state into a power on state.

When it is determined in the step S401 that the storage device has transited into the power on state, the processor 110 reads the address mapping information from the storage medium 150 or the non-volatile memory device 170 and store the read address mapping information in the RAM 130 (S402).

The processor 110 determines whether or not the address mapping recovery information is present in the non-volatile memory device 170 (S403). When the storage device is abnormally powered off prior to transition into the power on state, the address mapping recovery information may be stored in the non-volatile memory device 170. If the storage device has been normally powered off without occurrence of an abnormal power off state prior to transition into the power on state, the address mapping recovery information may not be stored in the non-volatile memory device 170.

When it is determined in the step S403 that the address mapping recovery information is present in the non-volatile memory device 170, the processor 110 reads the address mapping recovery information from the non-volatile memory device 170 and stores the read address mapping recovery information in the RAM 130 (S404).

The processor 110 then determines whether or not a rPrevPBA value of the address mapping recovery information stored in the RAM 130 is NULL (S405).

If it is determined in the step S405 that the rPrevPBA value of the address mapping recovery information is not NULL, the processor 110 reads the address mapping recovery information from the physical address of the storage medium 150, which has been read from the rPrevPBA of the address mapping recovery information (S406).

If it is determined in the step S405 that the rPrevPBA of the address mapping recovery information is NULL, the processor 110 reconfigures the address mapping information (S407).

Figure 24:
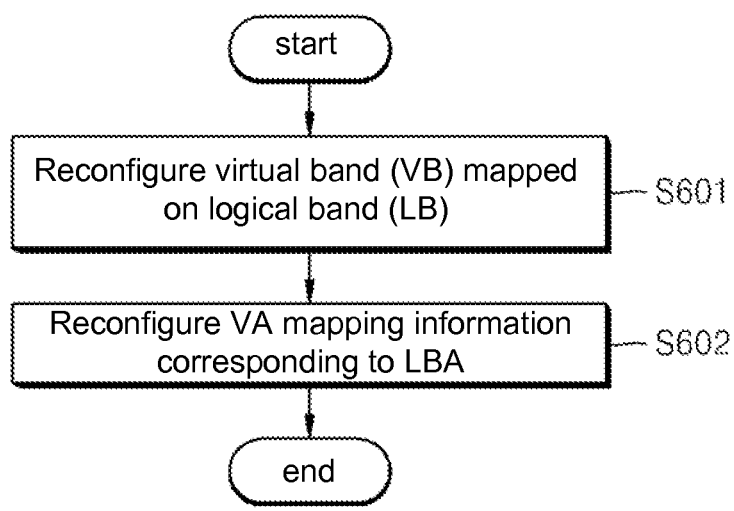
FIG. 24 is a detailed flowchart illustrating a process of reconfiguring address mapping information illustrated in FIGS. 22 and 23.

The process of reconfiguring the address mapping information may be performed according to processes as illustrated in FIG. 24.

Referring to FIG. 24, the processor 110 reconfigures a virtual band mapped onto a logical band in the address mapping information based on the address mapping recovery information (S601). In detail, a virtual band, which is not present in the address mapping information, among virtual bands included in the address mapping recovery information, may be newly allocated to the address mapping information.

The processor 110 reconfigures mapping information related to VAs corresponding to LBAs in the address mapping information based on the address mapping recovery information (S602). That is, mapping information between a VA and an LBA corresponding to a sector, which has been written on the storage medium 150 without being reflected in the address mapping information, may be added to the address mapping information.

Detailed operations of the steps S601 and S602 have been described in detail with reference to FIGS. 29A to 40, so duplicate description will be omitted.

Referring back to FIG. 22, the processor 110 stores the address mapping information, which has been reconfigured in the step S407, in the storage medium 150 or the non-volatile memory device 170 (S408). The processor 110 then deletes the address mapping recovery information stored in the RAM 130 and the non-volatile memory device 170 (S409).

Hereinafter, description will be given of an operation of updating the address mapping information in accordance with another exemplary embodiment with reference to FIG. 23.

The processor 110 determines whether or not the storage device is in the power on mode that power is supplied thereto (S501). That is, the processor 110 determines whether or not the storage device has transited from a power off state into a power on state.

When it is determined in the step S501 that the storage device has transited into the power on state, the processor 110 reads the address mapping information from the non-volatile memory device 170 and stores the read address mapping information in the RAM 130 (S502).

The processor 110 then determines whether or not the address mapping recovery information is included in the information read from the non-volatile memory device 170 (S503).

If the presence of the address mapping information is determined in the step S503, the processor 110 reads the address mapping information (metadata) from the storage medium 150 or the non-volatile memory device 170 and stores the read address mapping information in the RAM 130 (S504).

The processor 110 determines whether or not the address mapping recovery information stored in the RAM 130 has been reflected in the address mapping information stored in the RAM 130 (S505). That is, the processor 110 may determine whether or not mapping information included in the address mapping recovery information has been reflected in the address mapping information.

If it is determined in the step S505 that the address mapping recovery information has not been reflected in the address mapping information, the processor 110 reconfigures the address mapping information (S506). The process of reconfiguring the address mapping information has been described above in detail, so duplicate description will be omitted.

When the address mapping recovery information has been reflected in the address mapping information according to the determination in the step S505, the process may go to the step S507 by skipping the step S506.

Next, the processor 110 determines whether or not the rPrevPBA value of the address mapping recovery information stored in the RAM 130 is NULL (S507).

If it is determined in the step S507 that the rPrevPBA value of the address mapping recovery information is not NULL, the processor 110 reads the address mapping recovery information from the physical address of the storage medium 150, which has been read from the rPrevPBA of the address mapping recovery information (S508). Afterwards, the step S505 is re-performed.

If it is determined in the step S507 that the rPrevPBA value of the address mapping recovery information is NULL, the processor 110 stores the reconfigured address mapping information in the storage medium 150 or non-volatile memory device 170 (S509). The processor 110 then deletes the address mapping recovery information stored in the RAM 130 or the non-volatile memory device 170 (S510).

Figure 25:
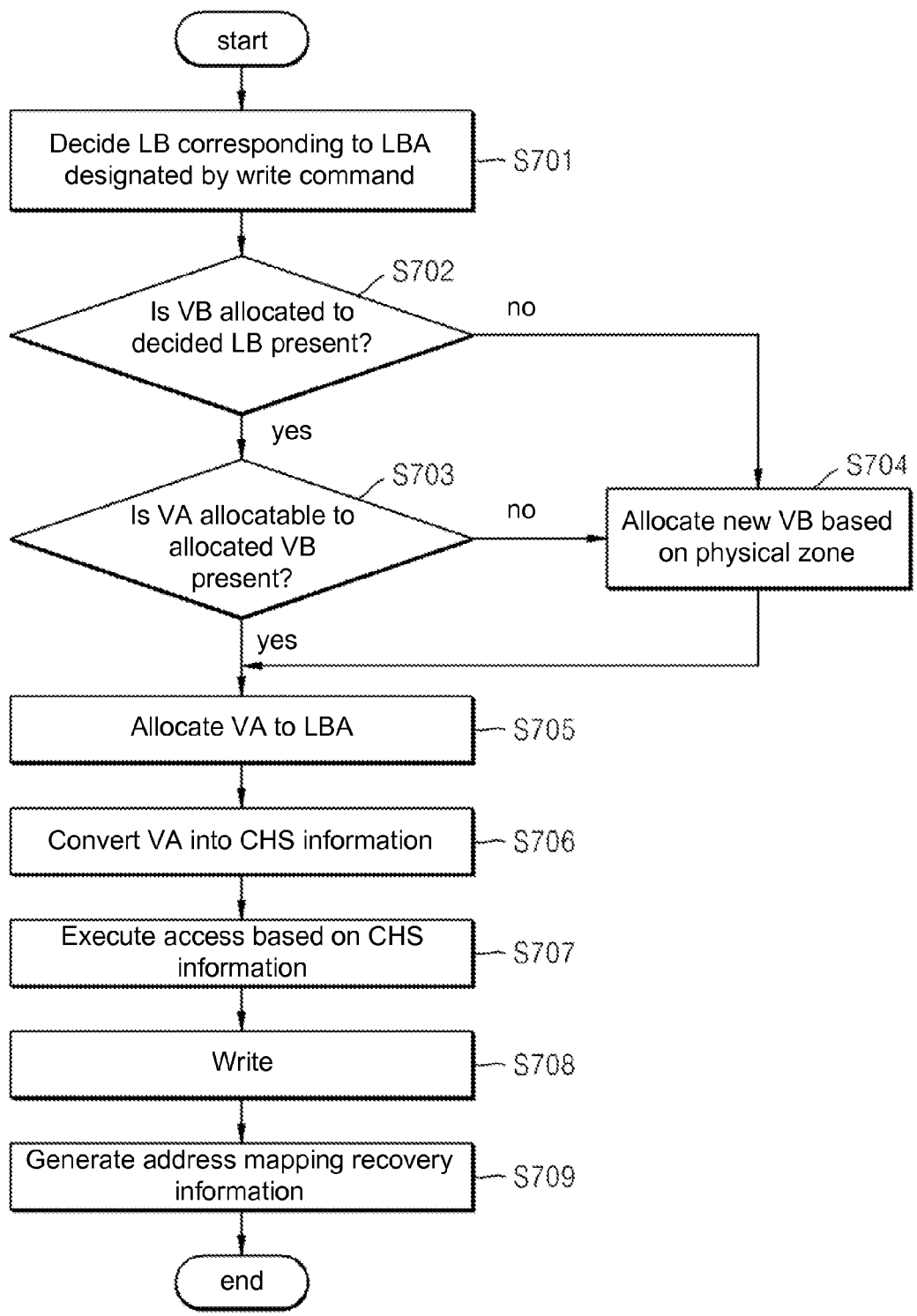
FIG. 25 is a detailed flowchart illustrating a writing process in accordance with one exemplary embodiment.

For reference, a write process and a process of generating the address mapping recovery information will be described in detail with reference to FIG. 25.

The processor 430 decides a logical band (LB) corresponding to an LBA designated by a received write command (S701). In detail, the processor 430 decides a logical band corresponding to the LBA designated by the received write command as a logical band, which includes the LBA designated by the received write command. For example, when LBAs 0 to 999 are allocated to a logical band 0 and the LBA designated by the write command is 75, a logical band corresponding to the LBA designated by the write command is decided as the logical band 0.

The processor 430 determines whether or not a virtual band allocated to the logical band decided in the step S701 is present (S702). More concretely, the processor 430 searches for the address mapping information 470-1 stored in the RAM 470 and determines whether or not a virtual band allocated to the logical band decided in the step S701 is present.

If it is determined in the step S702 that the virtual band allocated to the logical band decided in the step S701 is present, then the processor 430 determines whether or not allocatable virtual addresses VA are present in the virtual band allocated (S703). That is, the processor 430 determines whether or not virtual addresses to be allocatable in the allocated virtual band is left without being allocated. When the last accessed virtual address in the allocated virtual band is a virtual address corresponding to the last sector included in the virtual band, the processor 430 determines that any allocatable virtual address is not left. For example, when a size of the virtual band is set to 200 sectors and start virtual addresses are set to 0 to 199, if the last accessed virtual address is 199, it may be determined that no allocatable virtual address is not left in the corresponding virtual band.

If any virtual band allocated to the logical band decided in the step S701 is not left according to the determination of the step S702 or any allocatable virtual address is not left in the allocated virtual band according to the determination of the step S703, the processor 430 allocates a new virtual band to the logical band decided in the step S701 based on a physical zone (S704). That is, the processor 430 may allocate a virtual band, which has not been allocated to another logical band among virtual bands included in a physical zone corresponding to the logical band, which includes the LBA designated by the command, to the logical band including the LBA designated by the command.

The processor 430 then allocates a virtual address VA corresponding to the LBA designated by the command based on the allocated virtual band (S705). In detail, when a new virtual band has been allocated according to the step S704, the processor 430 may allocate a start virtual address, which indicates a newly allocated first sector of the newly allocated virtual band to the LBA designated by the command. When a virtual address allocatable to the LBA is left in the virtual band, which has already been allocated to the logical band, the processor 430 may allocate a virtual address, which is consecutive to the last accessed virtual address in the virtual band, to the LBA designated by the command.

The processor 430 then converts the virtual address allocated in the step S705 into CHS information corresponding to physical access position information related to the disk 12 (S706).

The processor 430 executes a seek operation based on the CHS information corresponding to the physical access position information converted in the step S706 (S707). In detail, the processor 430 generates a VCM driving control signal for moving the magnetic head 16 to a target track position of the disk 12 based on the converted CHS information. Referring to FIG. 4, when the generated VCM driving control signal is applied to the VCM driving unit 440, the VCM driving unit 440 generates a VCM driving current corresponding to the VCM driving control signal, to supply to the VCM 30. Accordingly, the magnetic head 16 is moved to a track and a sector of the disk desired to access.

After completion of the seek operation in the step S707, the processor 430 writes data on a sector position corresponding to the VA of the disk (S708). If firmware is designed such that both the data and LBA can be written, the processor 430 controls the disk drive such that the data can be written on a data storage area of the sector and the LBA can be written on the space area of the sector.

Through those operations, the write operation may be performed in the disk drive.

Hereinafter, description will be given of a method for managing address mapping information via a network in accordance with one exemplary embodiment.

First, a network system for performing the method for managing address mapping information with respect to a storage device via a network will be described with reference to FIG. 41.

Figure 41:
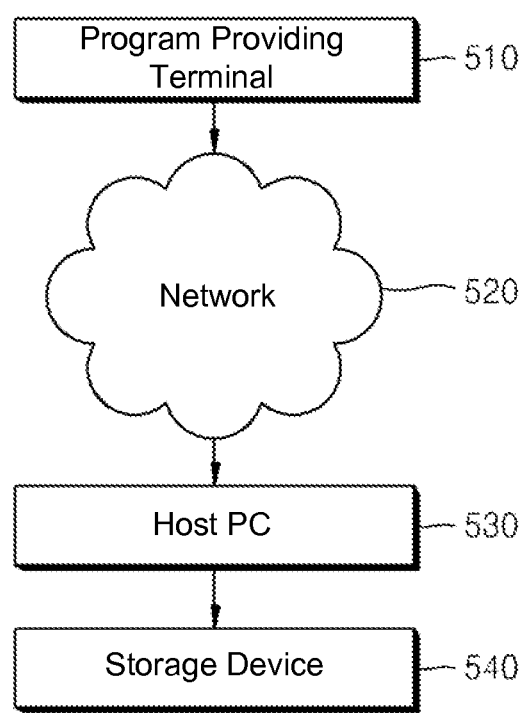
FIG. 41 is a view illustrating a network architecture for explaining a method for managing address mapping information through the network in accordance with one exemplary embodiment.

As illustrated in FIG. 41, a network system in accordance with one exemplary embodiment of the present disclosure may include a program providing terminal 510, a network 520, a host PC 530, and a storage device 540.

The network 520 may be implemented as a communication network such as an Internet or the like. Alternatively, the network 520 may be implemented as a wireless communication network as well as a wired communication network.

The program providing terminal 510 may store an address mapping information management program according to the flowcharts illustrated in FIGS. 19 to 25.

The program providing terminal 510 may transmit the address mapping information management program to the host PC 530 in response to a program transmission request by the host PC 530, which is connected thereto via the network 520.

The host PC 530 may include hardware and software for requesting for transmission of the address mapping information management program after being connected to the program providing terminal 510 via the network 520, and downloading the requested address mapping information management program from the program providing terminal 510.

The host PC 530 may execute the address mapping information management method in the storage device 540 according to the present disclosure based on the flowcharts illustrated in FIGS. 19 to 25 by the address mapping information management program downloaded from the program providing terminal 510.

Hereinafter, description will be given of a method for managing address mapping information via a network in accordance with one exemplary embodiment with reference to FIG. 42.

First, the host PC 530 using the storage device 540 such as a disk drive accesses the program providing terminal 510 via the network 520 (S801).

After access to the program providing terminal 510, the host PC 530 transmits information for requesting for transmission of an address mapping information management program to the program providing terminal 510 (S802).

The program providing terminal 510 transmits the requested address mapping information management program to the host PC 530, and accordingly the host PC 530 downloads the address mapping information management program (S803).

Afterwards, the host PC 530 controls the storage device to execute the downloaded address mapping information management program (S804). As the address mapping information management program is executed in the storage device, address mapping recovery information may be stored in a non-volatile memory device using preliminary power when an abnormal power off occurs in the storage device, and the address mapping information for the storage device may be updated based on the address mapping recovery information stored in the non-volatile memory device.

The present disclosure may be applied to storage devices using various write schemes, in addition to the disk drive using the shingled-write scheme.

In an example embodiment, a method for managing address mapping information may comprise writing address mapping recovery information on a user data area of a storage medium in an initially set size unit, the address mapping recovery information being generated in response to a write operation; storing the address mapping recovery information without being written on the storage medium in a non-volatile memory device when an abnormal power off occurs in a storage device; and updating the address mapping information related to the storage device based on the address mapping recovery information stored in the non-volatile memory device and the storage medium when power is applied to the storage device.

The method may also include wherein the address mapping recovery information comprises information related to a position of data written on the storage medium without being reflected in the address mapping information.

The method may also include wherein the address mapping recovery information comprises a physical address for the position of the data written on the storage medium without being reflected in the address mapping information stored in the storage medium or the non-volatile memory device, a logical block address mapped onto the physical address, and a physical address of the storage medium where previous address mapping recovery information has been written.

The method may also include storing the address mapping recovery information in a volatile memory device, wherein the address mapping recovery information written on the storage medium is deleted from the volatile memory device, and the physical address of the storage medium where the address mapping recovery information has been written is stored in the volatile memory device so as to be included in the next address mapping recovery information.

The method may also include wherein upon writing data and a corresponding logical block address on the storage medium during a write operation in the storage device, the address mapping recovery information is generated to include a physical address for a position of data written on the storage medium without being reflected in the address mapping information and a physical address of the storage medium where previous address mapping recovery information has been written.

The method may also include wherein the updating of the address mapping information is performed to read the address mapping recovery information written on the data area of the storage medium using the address mapping recovery information read from the non-volatile memory device, and reconfigure the address mapping information based on the address mapping recovery information read from the non-volatile memory device and the storage medium.

The method may also include wherein the updating of the address mapping information comprises reading the address mapping recovery information from the non-volatile memory device when power is applied to the storage device; reading the address mapping recovery information from a physical address position of the storage medium where previous address mapping recovery information has been written, the previous address mapping information being included in the address mapping recovery information read from the non-volatile memory device; reading the address mapping recovery information from the physical address position of the storage medium where the previous address mapping recovery information has been written, when the address mapping recovery information read from the storage medium includes the physical address of the storage medium where the previous address mapping recovery information has been written; reconfiguring the address mapping information based on the address mapping recovery information read from the non-volatile memory device or the storage medium, when the address mapping recovery information does not include the physical address of the storage medium where the previous address mapping recovery information has been written; and storing the reconfigured address mapping information in the storage device.

In another example embodiment, a data storage device may comprise: a storage medium; a storage medium interface configured to write or read data by accessing the storage medium; a volatile memory device; a non-volatile memory device; and a processor configured to control the storage medium interface to write data on the storage medium or read data from the storage medium, wherein the processor generates address mapping recovery information in response to a write operation to store in the volatile memory device, writes the address mapping recovery information stored in the volatile memory device on a user data area of the storage medium in an initially set size unit, reads the address mapping recovery information from the volatile memory device using preliminary power when an abnormal power off occurs so as to store in the non-volatile memory device, and reads the address mapping recovery information written on the storage medium based on the address mapping recovery information stored in the non-volatile memory device so as to update address mapping information.

The data storage device may also include wherein the processor deletes the address mapping recovery information written on the storage medium from the volatile memory device, and stores a physical address of the storage medium where the address mapping recovery information has been written in the volatile memory device so as to be included in the next address mapping recovery information.

The data storage device may also include wherein the processor reads the address mapping recovery information from a physical address of the storage medium where previous address recovery information has been written, the previous address mapping recovery information being included in the address mapping recovery information read from the non-volatile memory device, and reconfigures the address mapping information based on the address mapping recovery information read from the non-volatile memory device or the storage medium.

The present disclosure may be executed as a method, an apparatus, a system and the like. When being executed as software, components of the present disclosure may be code segments for executing necessary tasks. Programs or code segments may be stored in a program-readable medium. Examples of the program-readable medium may include an electronic circuit, a semiconductor memory device, ROM, a flash memory, an Erasable ROM (EROM), a floppy disk, an optical disk, a hard disk and the like.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for managing address mapping information of a data storage device, the method comprising:
generating the address mapping information as a data structure that represents a state of a non-volatile storage medium of the data storage device;
storing the address mapping information in the storage medium or in a non-volatile memory device of the data storage device;
using a read/write channel circuit to perform a first succession of write operations to write user data to a user data area of the storage medium;
writing a first set of address mapping recovery information to a selected address of the user data area of the storage medium, the first set of address mapping recovery information generated in response to the first succession of write operations;
subsequently using the read/write channel circuit to perform a second succession of write operations to write user data to the user data area of the storage medium;
storing a second set of address mapping recovery information in the non-volatile memory device responsive to an abnormal power off occurrence associated with the data storage device, the second set of address mapping recovery information generated responsive to the second succession of write operations to the storage medium and including the selected address of the user data area of the storage medium to which the first set of address mapping recovery information was written;
updating the address mapping information based on the second set of address mapping recovery information stored in the non-volatile memory device and the first set of storage medium responsive to a subsequent reapplication of power to the storage device, the selected address from the second set of address mapping recovery information used to locate and retrieve the first set of address mapping recovery information; and
storing the updated address mapping information in the storage medium or non-volatile memory device.

2. The method of claim 1, wherein each of the first and second sets of the address mapping recovery information comprises selected address information related to a position of data written on the storage medium, wherein the selected address information is not transferred to the address mapping information during the updating step.

3. The method of claim 1, wherein each of the first and second sets of the address mapping recovery information comprises a physical address for the position of the data written on the storage medium without being reflected in the address mapping information stored in the storage medium or the non-volatile memory device, a logical block address mapped onto the physical address, and a physical address of the storage medium where previous address mapping recovery information has been written.

4. The method of claim 1, wherein the writing of the first set of address mapping recovery information to the storage medium comprises transferring the first set of address mapping recovery information from a volatile memory device to a selected address of the storage medium and storing the selected address of the storage medium in the volatile memory device, and wherein the selected address in the volatile memory device is incorporated into the second set of address mapping recovery information for use in locating the first set of address mapping recovery information.

5. The method of claim 1, wherein the storage medium comprises a rotatable magnetic recording medium on which shingled tracks are grouped into virtual bands each having a selected data capacity, the virtual bands are selectively allocated to logical bands of successive logical addresses of user data, the respective first and second successions of write operations append data to the respective virtual bands in relation to the logical bands associated with said write operations, and the address mapping information is arranged to identify a next available address adapted to receive new data in each of the allocated virtual bands.

6. The method of claim 5, wherein the first and second sets of address mapping recovery information are sequentially formed in a volatile memory device using a common table structure having a previous address pointer field to identify an address of a previously stored set of the address mapping recovery information and a total plural number n entries each identifying a logical address and a physical address of data written to the storage medium during a separate write operation, the first set of address mapping recovery information having n total entries and the second set of address mapping recovery information having a total number m entries less than n, the first set of address mapping recovery information being written to the storage medium responsive to the total number of entries therein reaching the plural number n.

7. The method of claim 1, wherein the updating of the address mapping information comprises:
reading the second set of address mapping recovery information from the non-volatile memory device when power is applied to the storage device;
recovering, from the second set of address mapping recovery information, the identified address of the storage medium to which the first set of address mapping recovery information was written;
reading the first set of address mapping recovery information from the storage medium using the recovered identified address from the second set of address mapping recovery information;
reconfiguring the address mapping information using the first and second sets of address mapping recovery information; and
storing the reconfigured address mapping information in the storage device.

8. A storage device comprising:
a non-volatile data storage medium;
a volatile solid-state memory device;
a non-volatile solid-state memory device;
a read/write channel circuit configured to write user data to the storage medium; and
a processor configured to manage address mapping information associated with user data stored on the storage medium by generating and storing a first version of the address mapping information to the storage medium or the non-volatile memory device which represents a state of the storage medium at a first time, accumulating a first set of address mapping recovery information in the volatile solid-state memory device responsive to a plural number n successive data write operations to write user data to the storage medium using the read/write channel circuit after the first time and storing the first set of address mapping recovery information to the storage medium at a selected address at a second time, accumulating a second set of address mapping recovery information in the volatile memory responsive to a plural number m less than n successive data write operations to write user data to the storage medium using the read/write channel circuit after the second time and storing the second set of address mapping recovery information in the non-volatile memory device responsive to an abnormal power off occurrence associated with the storage device at a third time, and generating an updated, second version of the address mapping information by combining the first and second sets of address mapping recovery information responsive to a reapplication of power to the storage medium at a fourth time, the second set of address mapping recovery information comprising the selected address, the processor retrieving the selected address from the second set of address mapping recovery information to locate and retrieve the first set of address mapping recovery information from the storage medium.

9. The device of claim 8, wherein processor deletes the first set of address mapping recovery information written on the storage medium from the volatile memory device, and stores the selected address as a physical address of the storage medium where the address mapping recovery information has been written in the volatile memory device so as to be included in the second set of address mapping recovery information.

10. The device of claim 8, wherein the storage medium is a rotatable magnetic recording medium which supports shingled tracks grouped into virtual bands each having a selected data capacity, the virtual bands selectively allocated to logical bands of successive logical addresses of user data, wherein the successive write operations to the storage medium append data to the respective virtual bands in relation to the logical bands associated with said write operations, and the address mapping information is arranged to identify a next available address adapted to receive new data in each of the allocated virtual bands.

11. The data storage device of claim 10, wherein each of the first and second versions of the address mapping information comprise first and second data structures, the first data structure identifying a total number of virtual bands allocated to each logical band and a last allocated address in each of the allocated virtual bands, the second data structure identifying contiguous sets of user data written to the storage medium, each contiguous set identified by starting logical address, starting physical address within the associated virtual band and a total sector count.

12. The data storage device of claim 11, wherein each of the first and second sets of address mapping recovery information comprises a common table structure having a previous address field to identify the physical address on the storage medium of a previously stored set of the address mapping recovery information and a total number of entry fields corresponding to the plural number n, each of the entry fields adapted to identify a logical address and a physical address of data written to the storage medium during a separate write operation, wherein the processor writes the first set of address mapping recovery information to the storage medium upon the occurrence of the nth data write operation after the first time.

13. The data storage device of claim 8, wherein the storage medium is a rotatable magnetic recording medium and the non-volatile memory device is a flash memory device.

14. The data storage device of claim 8, wherein the processor maintains a copy of the first version of the address mapping information in the volatile memory device, updates the first version of the address mapping information in the volatile memory device responsive to at least some of the plural number n successive data write operations or plural number n successive data write operations to provide a third version of the address mapping information, wherein the third version of the address mapping information is not retained in a non-volatile memory responsive to the abnormal power shut down occurrence.

15. The data storage device of claim 8, wherein the processor is a programmable processor which executes associated programming steps in a memory.

16. A method comprising:
generating and storing a first version of address mapping information as a data structure in a non-volatile memory to describe a state of a non-volatile storage medium of a data storage device;
performing a plural number n subsequent data write operations to the storage medium using a read/write channel circuit;
accumulating a first set of address mapping recovery information in a volatile memory that describes the plural number n subsequent data write operations to the storage medium;

storing the first set of address mapping recovery information to a selected address of the storage medium;

performing a plural number m less than n subsequent data write operations to the storage medium using the read/write channel circuit;

accumulating a second set of address mapping recovery information in the volatile memory responsive to the plural number m subsequent data write operations to the storage medium;

detecting an abnormal power off occurrence associated with the storage device;

storing the second set of address mapping recovery information in the non-volatile memory device responsive to the abnormal power off occurrence, the second set of address mapping recovery information comprising the selected address at which the first set of address mapping recovery information is stored;

detecting a subsequent reapplication of power to the storage device;

retrieving the selected address from the second set of address mapping recovery information to locate and retrieve the first set of address mapping recovery information; and generating an updated, second version of the address mapping information using the first and second sets of address mapping recovery information.

17. The method of claim 16, further comprising retrieving the second set of address mapping recovery information from the non-volatile memory device, recovering the selected address therefrom, and retrieving the first set of address mapping recovery information using the recovered selected address from the second set of address mapping recovery information.

18. The method of claim 16, wherein the storage medium is a rotatable magnetic recording medium which supports shingled tracks grouped into virtual bands each having a selected data capacity, the virtual bands selectively allocated to logical bands of successive logical addresses of user data, wherein the successive write operations to the storage medium append data to the respective virtual bands in relation to the logical bands associated with said write operations, and the address mapping information is arranged to identify a next available address adapted to receive new data in each of the allocated virtual bands.

19. The method of claim 18, wherein each of the first and second versions of the address mapping information comprise first and second data structures, the first data structure identifying a total number of virtual bands allocated to each logical band and a last allocated address in each of the allocated virtual bands, the second data structure identifying contiguous sets of user data written to the storage medium, each contiguous set identified by starting logical address, starting physical address within the associated virtual band and a total sector count.

20. The method of claim 16, wherein each of the first and second sets of address mapping recovery information comprises a common table structure having a previous address field to identify the physical address on the storage medium of a previously stored set of the address mapping recovery information and a total number of entry fields corresponding to the plural number n, each of the entry fields adapted to identify a logical address and a physical address of data written to the storage medium during a separate write operation, and wherein the first set of address mapping recovery information is written to the storage medium responsive to the occurrence of the nth data write operation after the generation of the first version of the address mapping information.

* * * * *